United States Patent
Yamamoto et al.

(10) Patent No.: US 7,531,016 B2
(45) Date of Patent: May 12, 2009

(54) CHEMICAL REACTION APPARATUS AND POWER SUPPLY SYSTEM

(75) Inventors: Tadao Yamamoto, Tokyo (JP); Osamu Nakamura, Kodaira (JP); Keishi Takeyama, Hamura (JP); Tsutomu Terazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 789 days.

(21) Appl. No.: 10/477,576

(22) PCT Filed: Mar. 19, 2003

(86) PCT No.: PCT/JP03/03364

§ 371 (c)(1),
(2), (4) Date: Nov. 12, 2003

(87) PCT Pub. No.: WO03/082460

PCT Pub. Date: Oct. 9, 2003

(65) Prior Publication Data

US 2004/0148858 A1    Aug. 5, 2004

(30) Foreign Application Priority Data

Mar. 29, 2002   (JP)   ............................. 2002-094271
Mar. 14, 2003   (JP)   ............................. 2003-069442

(51) Int. Cl.
*B01J 8/00*   (2006.01)
(52) U.S. Cl. ...................... 48/127.9; 422/190; 422/193; 422/198
(58) Field of Classification Search .................. 429/12, 429/34, 35
See application file for complete search history.

(56) References Cited

U.S. PATENT DOCUMENTS 5,716,842 A    2/1998   Baier et al.
6,119,889 A *  9/2000   Fujii et al. ............. 220/592.27

(Continued)

FOREIGN PATENT DOCUMENTS

DE    199 20 786 A1    11/2000

(Continued)

OTHER PUBLICATIONS

Poser, S. et al. "Chip elements for fast thermocycling" Sensors and Actuators A, Elsevier Sequoia S.A., Lausanne, CH, vol. 62, No. 1-3, Jul. 1, 1997, pp. 672-675, XP004119707, ISSN: 0924-4247.

(Continued)

*Primary Examiner*—Jonathan Crepeau
*Assistant Examiner*—Tony Chuo
(74) *Attorney, Agent, or Firm*—Frishauf, Holtz, Goodman & Chick, P.C.

(57) ABSTRACT

A chemical reaction apparatus includes a solid body which has an outer surface, and in which at least one flow path which allows a chemical medium to flow is formed. This body has a heating element which heats the chemical medium in the flow path to accelerate a chemical reaction of the chemical medium, and a heat radiation preventing film which covers at least a portion of the outer surface of the body, and prevents radiation of heat generated by the heating element from a portion of the outer surface.

26 Claims, 16 Drawing Sheets

U.S. PATENT DOCUMENTS

| | | |
|---|---|---|
| 6,159,434 A | 12/2000 | Gonjo et al. |
| 6,200,536 B1 | 3/2001 | Tonkovich et al. |
| 6,428,758 B1 | 8/2002 | Schuessler et al. |
| 6,447,736 B1 | 9/2002 | Autenrieth et al. |
| 6,638,654 B2 | 10/2003 | Jankowksi et al. |
| 6,786,716 B1 | 9/2004 | Gardner et al. |
| 6,824,905 B2 | 11/2004 | Shioya et al. |
| 6,916,565 B2 | 7/2005 | Shioya |
| 7,169,367 B2 | 1/2007 | Takeyama et al. |
| 7,175,817 B2 | 2/2007 | Kawamura et al. |
| 2002/0094462 A1 | 7/2002 | Shioya et al. |
| 2003/0039874 A1 | 2/2003 | Jankowski et al. |
| 2003/0103878 A1 | 6/2003 | Morse et al. |
| 2003/0138685 A1 | 7/2003 | Jankowski et al. |
| 2004/0018129 A1 | 1/2004 | Kawamura et al. |
| 2004/0025784 A1 | 2/2004 | Kawamura et al. |
| 2004/0043273 A1 | 3/2004 | Jankowksi et al. |
| 2004/0048128 A1 | 3/2004 | Jankowksi et al. |
| 2004/0148858 A1 | 8/2004 | Yamamoto et al. |
| 2004/0148859 A1 | 8/2004 | Kawamura et al. |

FOREIGN PATENT DOCUMENTS

| | | |
|---|---|---|
| DE | 100 10 400 A1 | 9/2001 |
| DE | 102 42 020 A1 | 3/2003 |
| EP | 0 861 802 A2 | 9/1998 |
| EP | 1 022 059 A2 | 7/2000 |
| EP | 1 188 476 A2 | 3/2002 |
| GB | 2 327 028 A | 1/1999 |
| JP | 2-172538 A | 7/1990 |
| JP | 05-235510 A | 9/1993 |
| JP | 6-111838 * | 4/1994 |
| JP | 6-111838 A | 4/1994 |
| JP | 6-233918 A | 8/1994 |
| JP | 7-159215 A | 6/1995 |
| JP | 08-508197 A | 9/1996 |
| JP | 10-268343 A | 10/1998 |
| JP | 10-284836 A | 10/1998 |
| JP | 11-031577 * | 2/1999 |
| JP | 2000-026105 A | 1/2000 |
| JP | 2000-506432 A | 5/2000 |
| JP | 2002-18271 A | 1/2002 |
| JP | 2003-526359 A | 9/2003 |
| JP | 2004-537392 A | 12/2004 |
| JP | 2003-45459 * | 2/2006 |
| WO | WO 99/41015 A1 | 8/1999 |
| WO | WO 00/45457 A1 | 8/2000 |
| WO | WO 01/41931 A2 | 6/2001 |
| WO | WO 02/24322 A2 | 3/2002 |
| WO | WO 03/082460 A1 | 10/2003 |
| WO | WO 2004/030805 A1 | 4/2004 |

OTHER PUBLICATIONS

Srinivasan R. et al., "Micromachined Reactors For Catalytic partial Oxidation Reactions" Aiche Journal, New York, NY US, vol. 43, No. 11, Nov. 1997, pp. 3059-3069, XP000669285, ISSN: 0001-1541.

Derwent Abstract Accession No. 2003-407946/39, JP 2003-045459 A (Casio Computer Co. LTD), Feb. 14, 2003.

Derwent Abstract Accession No. 2003-581544/55, JP 2003-168685 A (Casio Computer Co. LTD), Jun. 13, 2003.

Mexican Office Action (and English translation thereof) dated Sep. 11, 2008, issued in a counterpart Mexican Application.

* cited by examiner

CHEMICAL REACTION APPARATUS AND POWER SUPPLY SYSTEM

This application is a U.S. National Phase Application under 35 USC 371 of International Application PCT/JP03/03364 filed Mar. 19, 2003.

TECHNICAL FIELD

The present invention relates to a chemical reaction apparatus and a power supply system including this chemical reaction apparatus and, more particularly, to a chemical reaction apparatus applied to a power supply system including a fuel cell which generates electric power by using fuel.

BACKGROUND ART

In the technical field of chemical reactions, chemical reaction apparatuses are known in which various fluidized material mixtures are supplied to flow paths to cause chemical reactions, i.e., catalyst reactions with catalysts placed in the flow paths, thereby producing desired fluid materials.

These chemical reaction apparatuses have various scales and structures in accordance with their applications. For example, in a certain relatively small-sized chemical reaction apparatus, a micron-order or millimeter-order flow path is formed in a silicon substrate by using the micropatterning technology developed in the technology for fabricating semiconductors such as semiconductor integrated circuits, and fluid is supplied to this flow path to cause a chemical reaction.

FIG. 15 is an opened-up plan view showing an example of such a conventional chemical reaction apparatus. FIG. 16 is a sectional view taken along a line C-C in FIG. 15.

This chemical reaction apparatus includes a silicon substrate 1. On one surface of the silicon substrate 1, a fine zigzagged flow path 2 is formed by using the micropatterning technology developed in the semiconductor fabrication technology.

The two end portions of the flow path 2 are extended to substantially central portions of two predetermined end faces to form an inlet port 3 and outlet port 4. A catalyst layer 5 for performing a chemical reaction is formed on the inner wall surface of the flow path 2.

A glass substrate 6 is bonded to the above-mentioned surface of the silicon substrate 1. On the surface of the glass substrate 6 away from the surface opposite to the silicon substrate 1, a zigzagged thin-film heater 7 corresponding to the flow path 2 is provided.

The width of the thin-film heater 7 is made slightly smaller than that of the flow path 2. If the chemical reaction (catalyst reaction) in the chemical reaction apparatus induces an endothermic reaction under predetermined heat conditions, the thin-film heater 7 supplies predetermined thermal energy to the catalyst in the flow path 2 upon the chemical reaction.

A use example of this chemical reaction apparatus having the above arrangement will be explained below.

Recently, research and development for putting a power supply system using a fuel cell into practical use have been extensively done. A chemical reaction apparatus having the above arrangement can be used in this power supply system using a fuel cell. By this chemical reaction apparatus, as will be explained below, hydrogen can be produced from a power generation fuel gas and supplied to the fuel cell, and the power supply system using the fuel cell can be downsized.

While the thin-film heater 7 heats the interior of the flow path 2 to a predetermined temperature, the power generation fuel gas described above is supplied into the flow path 2 from the inlet port 3. This causes an endothermic reaction by the catalyst 5 in the flow path 2 to produce hydrogen and carbon dioxide as a byproduct. Of these products, only hydrogen can be produced by removing carbon dioxide from hydrogen. Electric power can be generated by supplying this hydrogen to the fuel cell.

In the above conventional chemical reaction apparatus, when the interior of the flow path 2 is heated by the thin-film heater 7, the two substrates 1 and 6 are also heated. Therefore, if the whole outer surfaces of these substrates 1 and 6 are exposed to the atmosphere, the thermal energy generated by the thin-film heater 7 is partially radiated to the outside from the surfaces of the substrates 1 and 6. This increases the thermal energy loss and worsens the energy utilization.

DISCLOSURE OF INVENTION

The present invention has the advantage that in a chemical reaction apparatus which includes a flow path for allowing fluid to flow and causes a heating element to heat the interior of the flow path to perform a desired chemical reaction, the energy utilization is improved by suppressing the thermal energy loss caused when the thermal energy generated by the heating element is partially radiated outside. The present invention also has the advantage that when this chemical reaction apparatus is applied to a power supply system using a fuel reforming type fuel cell, the loss of thermal energy required for heating for power generation can be reduced, the energy utilization can be increased, and the power supply system can be downsized.

To obtain the above advantages, a chemical reaction apparatus according to one aspect of the present invention comprises a plurality of substrates bonded to each other, at least one flow path formed in at least one of the plurality of substrates, heating element formed on at least one surface of at least one of the plurality of substrates to heat the flow path, and a heat radiation preventing film which covers at least a portion of an outermost surface of the plurality of substrates. The heat radiation preventing film can suppress radiation of heat from the outer surface of the substrate.

This chemical reaction apparatus further comprises a box member which covers all the outermost surfaces of the plurality of substrates including the heat radiation preventing film, wherein a space is formed in at least a portion between the box member and the outermost surfaces of the plurality of substrates including the heat radiation preventing film. The space is kept in a substantially vacuum state, or a gas having thermal conductivity lower than that of components of the box member is sealed in the space, so heat conduction to the outside from the outer surface of the substrate including the heat radiation preventing film can be suppressed. Accordingly, it is possible to suppress the thermal energy loss when the heating element heats the interior of the flow path, and increase the energy utilization.

The plurality of substrates include at least a first substrate in one surface of which the flow path is formed, and a second substrate bonded to one surface of the first substrate.

The heat radiation preventing film is one of a metal film made of Au, Al, or Ag, and a metal oxide film made of $SnO_2$, $InO_3$, or ZnO. This heat radiation preventing film is at least one of a first heat radiation preventing film which covers at least a portion of the other surface of the first substrate away from one surface, a second heat radiation preventing film which covers at least a portion of the other surface of the second substrate away from one surface which opposes the first substrate, a third heat radiation preventing film which covers at least a portion of those side surfaces of the first substrate, which are perpendicular to the other surface, and a fourth heat radiation preventing film which covers at least a portion of those side surfaces of the second substrate, which are perpendicular to the other surface.

The heating element comprises a thin-film heater. This thin-film heater has one of a zigzagged shape corresponding to the shape of the zigzagged flow path, and a rectangular shape covering substantially the whole of the flow path, and is formed on at least one of that one surface of the second substrate, which opposes the first substrate, the other surface of the second substrate away from one surface, and the other surface of the first substrate away from one surface. On the surface on which the thin-film heater is formed, the heating element has an insulating film which covers the thin-film heater and has a flat upper surface. The heat radiation preventing film may be formed on this insulating film. Alternatively, it is possible to include a third substrate which is bonded onto the insulating film and has a recess in a surface which opposes the thin-film heater, and form the heat radiation preventing film on the outer surface of this third substrate. The recess is in a substantially vacuum state, or a gas having thermal conductivity lower than that of the third substrate is sealed in the recess.

Also, as the heating element, it is possible to include a combustion flow path having a combustion catalyst layer formed in at least a portion thereof, and a supplying unit which supplies a combustion fluid to the combustion flow path, and a thermal energy generating unit which generates thermal energy in the combustion flow path by a combustion reaction on the combustion catalyst layer.

When the chemical reaction apparatus of the present invention is applied to a power supply system including a fuel reforming type fuel cell, it is possible, as a fuel vaporizer, to supply an aqueous solution of methanol as power generation fuel to the flow path, and vaporize the fluid in the flow path by heating the flow path by the heating element. As a reforming unit, it is possible to form a reforming catalyst layer in the flow path, and reform the power generation fuel in the flow path by heating the flow path by the heating element, thereby produce hydrogen. As a carbon monoxide removing unit, it is possible to form a selective oxidation catalyst layer in the flow path, and remove carbon monoxide from a gas mixture containing carbon monoxide by heating the flow path by the heating element. Electric power can be generated by supplying hydrogen produced by these units to the fuel cell, and causing hydrogen and oxygen to react with each other. It is also possible to form a heat radiation preventing film which covers the outermost surfaces of the plurality of substrates of the chemical reaction apparatus, and further comprises a box member which covers all the outermost surfaces of the plurality of substrates including the heat radiation preventing film, and forms, around the outermost surfaces of the plurality of substrates including the heat radiation preventing film, a space which is in a substantially vacuum state or in which a gas having low thermal conductivity is sealed. In this manner, it is possible to reduce the loss of thermal energy required for heating for power generation, increase the energy utilization, and downsize the power supply system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate embodiments of the invention, and together with the general description given above and the detailed description of the embodiments given below, serve to explain the principles of the invention.

BEST MODE FOR CARRYING OUT THE INVENTION

Figure 1:
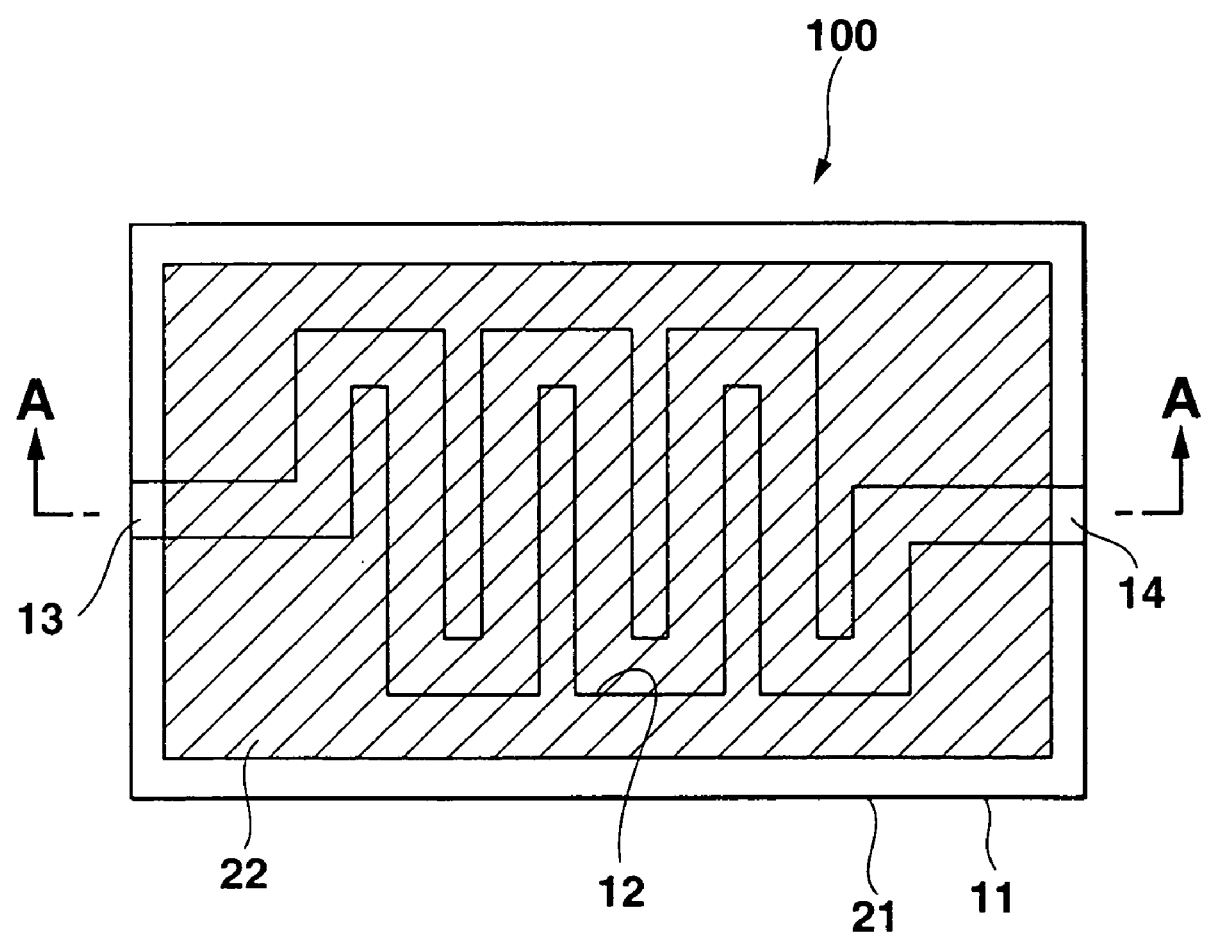
FIG. 1 is an opened-up plan view of the second embodiment of a chemical reaction apparatus according to the present invention.

A chemical reaction apparatus according to the present invention and a power supply system including this chemical reaction apparatus will be described in detail below on the basis of embodiments shown in the drawings.

<Chemical Reaction Apparatus>

FIRST EMBODIMENT

Figure 2:
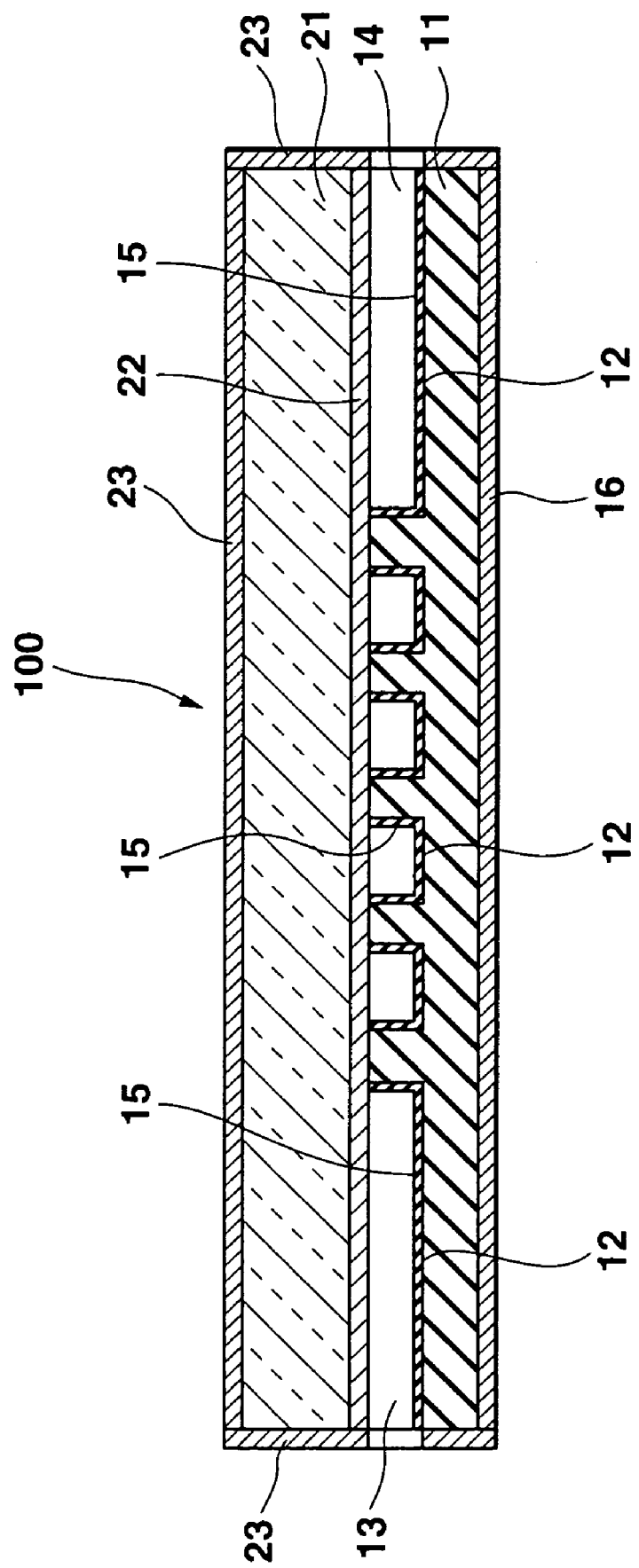
FIG. 2 is a sectional view of the second embodiment of the chemical reaction apparatus according to the present invention.
Figure 3:
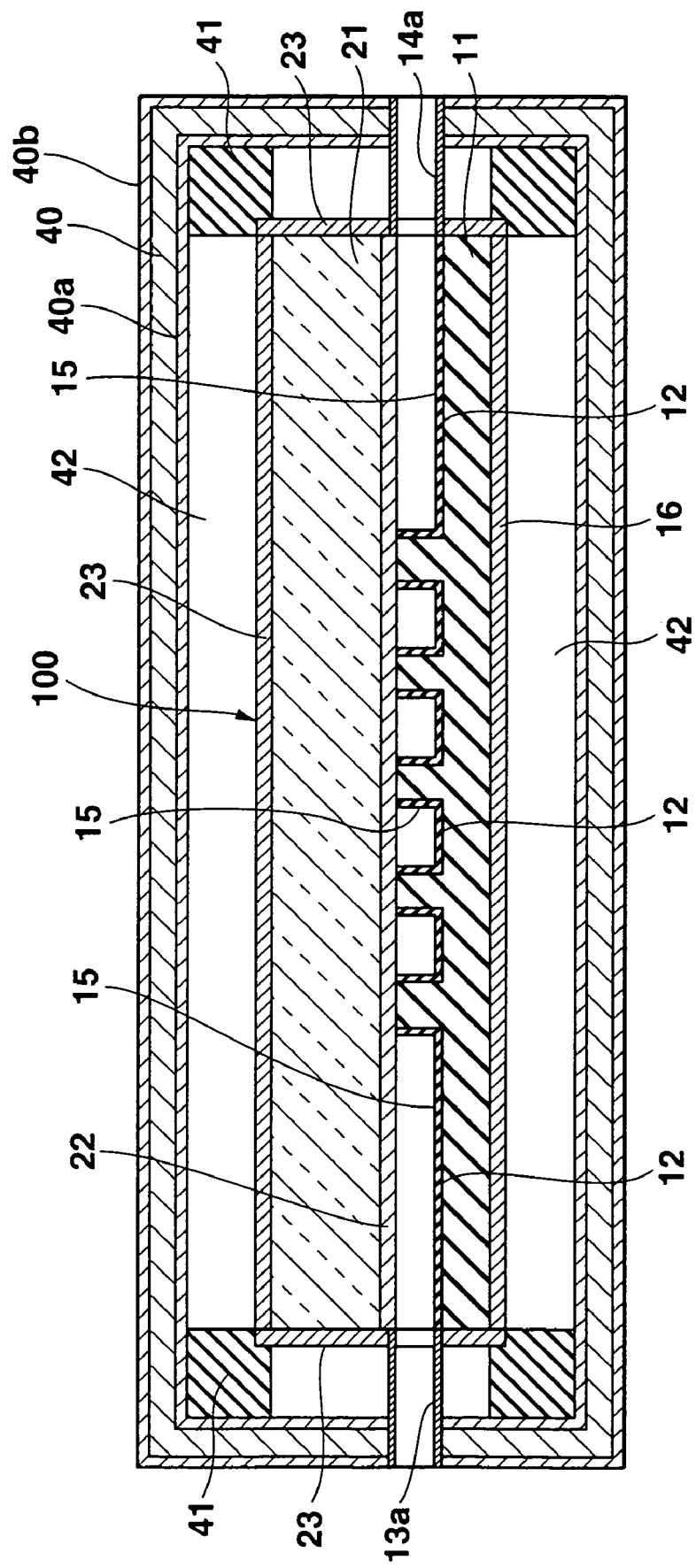
FIG. 3 is a sectional view showing the state in which the chemical reaction apparatus according to the present invention is packaged.

FIG. 1 is an opened-up plan view as the first embodiment of a chemical reaction apparatus 100 according to the present invention. FIG. 2 is a sectional view taken along a line A-A of this chemical reaction apparatus 100. FIG. 3 is a sectional view showing an example of the packaged state when the chemical reaction apparatus 100 according to the present invention is applied to an arbitrary system.

The chemical reaction apparatus 100 of the first embodiment of the present invention includes a rectangular, plate-like first substrate 11 having at least a flat upper surface and made of silicon. For example, the first substrate 11 has a length of about 15 to 35 mm, a width of about 10 to 25 mm, and a thickness of about 0.4 to 1.0 mm. In one surface, i.e., the upper surface of the first substrate 11, a fine zigzagged flow path 12 is formed by using the micropatterning technology developed in the semiconductor fabrication technology. For example, the flow path 12 has a width of about 0.2 to 0.8 mm, a depth of about 0.2 to 0.6 mm, and a total length of about 30 to 1,000 mm. The two end portions of the flow path 12 are extended to substantially central portions of two predetermined end faces of the first substrate 11 to form an inlet port 13 and outlet port 14. That is, the depth of the flow path 12 is set to be about half the substrate thickness.

For example, a reaction catalyst layer 15 for performing a desired chemical reaction is preferably formed on the entire inner wall surfaces of the flow path 12. The present invention is not limited to this form in which the reaction catalyst layer 15 is formed on the inner wall surfaces of the flow path 12. That is, an arrangement in which only the flow path 12 is formed and no reaction catalyst layer is formed is also possible.

A rectangular second substrate 21 which functions as a lid and is made of glass about 0.7 mm thick is adhered (bonded) on the upper surface of the first substrate 11, thereby forming a solid body by these two substrates. That surface of the second substrate 21, which faces the first substrate 11 or the lower surface of the second substrate 21 is flat. On substantially the whole of this surface (more specifically, the lower surface except for peripheral portions in this embodiment), a thin-film heater 22 made of a thin resistor film such as $TaSiO_x$ or $TaSiO_xN$ is formed as a heating element or heating element. This thin resistor film is formed by, e.g., sputtering.

As will be explained in the second to eighth embodiments described later, the heating element of the present invention, i.e., the thin-film heater 22 in this embodiment is not limited to the form in which it is formed on that surface of the second substrate 21, which opposes the first substrate 11. In short, this thin-film heater 22 need only be so designed as to supply predetermined thermal energy to the reaction catalyst layer 15 in the flow path 12, or to fluid flowing in the flow path 12, in order to progress a desired chemical reaction (catalyst reaction) in the flow path 12. When the thin-film heater 22 is formed on that surface of the second substrate 21, which faces the first substrate 11, i.e., when the thin-film heater 22 is formed immediately above or on the flow path 12 as in this first embodiment, the thermal energy can be efficiently supplied to the flow path 12. This relatively increases the thermal energy utilization.

In this first embodiment, the thin-film heater 22 is formed into a rectangular shape on substantially the whole of that surface of the second substrate 21, which opposes the first substrate 11. Therefore, the number of steps required for the formation of this thin-film heater 22 can be reduced, so the manufacturing cost can be reduced.

In this embodiment, as shown in FIG. 2, a heat radiation preventing film 16 is formed on the other surface or lower surface of the first substrate 11 and on the side surfaces except for the inlet port 13 and outlet port 14 of the first substrate 11. Likewise, a heat radiation preventing film 23 similar to the heat radiation preventing film 16 is formed on the surface of the second substrate 21 away from that surface which opposes the first substrate 11, or the upper surface of the second substrate 21, and on the side surfaces of the second substrate 21. Consequently, at least portions of the outer surfaces (surfaces to be directly exposed to the external ambient) of the chemical reaction apparatus are covered with the heat radiation preventing films 16 and 23.

As shown in FIG. 2, the heat radiation preventing films 16 and 23 preferably cover all the outer surfaces of the first and second substrates 11 and 21, i.e., substantially all the surrounding surfaces of the chemical reaction apparatus. However, the present invention is not limited to this form, so these films may also be partially formed as needed. For example, since the area of the side surfaces of each substrate is much smaller than that of all the outer surfaces, the heat radiation preventing films 16 and 23 may also be formed on the outer surfaces except for these side surfaces of the substrates. It is favorable to suppress radiation of heat from the first and second substrates 11 and 21 by forming the heat radiation preventing films 16 and 23 on the outer surfaces of these substrates. However, a heat radiation preventing film or films may also be formed only on the outer surfaces of one substrate, e.g., a substrate on which the thin-film heater is formed, i.e., the second substrate 21 in the arrangement shown in FIG. 2.

These heat radiation preventing films 16 and 23 are made of a metal material such as Au, Al, or Ag having high heat ray reflectance, or a metal oxide such as $SnO_2$, $InO_3$, or ZnO.

As a method of forming this heat radiation preventing film, the following methods can be applied. That is, it is possible to apply: a method in which a member obtained by forming the metal material described above into a foil or film is coated with the metal oxide described above, or a film of the metal oxide is formed on the member, and the resultant film is adhered to the outer surfaces of each substrate; a method in which a thin film of any of the above materials is formed on the outer surfaces of each substrate by using a thin film formation technique such as deposition, sputtering, or plating; or a method in which the outer surfaces of each substrate are coated with fine grains of any of the above materials together with an appropriate solvent.

Also, as shown in FIG. 3, when the chemical reaction apparatus 100 according to the present invention is applied to an arbitrary system, e.g., a power supply system using a fuel cell to be described later, this chemical reaction apparatus 100 may be packaged inside a support member 40 (e.g., a housing, box or mounting frame) via supporting pieces 41. The support member 40 supports an inlet pipe 13a and outlet pipe 14a. The inlet pipe 13a and outlet pipe 14a are connected to the inlet port 13 and outlet port 14 (FIG. 2), respectively, and preferably have a flow path having the same cross section as the flow path described earlier. The supporting pieces 41 are provided on, e.g., the four, upper and lower corners of the chemical reaction apparatus 100. Accordingly, a space or spaces 42 are formed between the support member 40 and chemical reaction apparatus 100 except for portions of the supporting pieces 41. The space 42 is a heat insulating space. The heat insulating performance may be improved by sealing a gas such as air, freon, or carbonic acid gas in the space. The heat insulating performance may also be further improved by setting a substantially vacuum state. Consequently, it is possible to suppress the thermal energy loss caused if the thermal energy partially leaks by heat conduction to the surrounding support member 40 from the heat radiation preventing films 16 and 23 formed on the surrounding surfaces of the chemical reaction apparatus 100.

The inner and/or outer surface of the box 40 may be covered with a radiation preventing film or layer 40a, 40b for reflecting heat (infrared light) outwardly radiated from the apparatus 100 so that outwardly escaping of heat energy, that is, heat loss may be prevented or decreased.

Where the space 42 is vacuumed to increase the insulating efficiency, the lower the pressure in the space is, the higher the insulating efficiency is. Practically, for example, the pressure in the space 42 may be about 100 Pa, or made lower than about 100 Pa. Where the pressure is about 100 Pa, the power applied to the thin-film heater 22 may be decreased about 30% in comparison with the case where the pressure in the space 42 is atmosphere. Preferably, the pressure in the space 42 is set to about 10 Pa or set to lower than about 10 Pa. Where the pressure is set to about 10 Pa, the power applied to the thin-film heater 22 may lower by about half in comparison with the case where the pressure in the space 42 is atmosphere.

It can be understood that the embodiment as shown in FIG. 3 is applicable not only to the chemical reaction apparatus of this first embodiment, but also to chemical reaction apparatuses of individual embodiments to be described later.

In the chemical reaction apparatus 100 according to this embodiment as described above, the heat radiation preventing films 16 and 23 are formed on the outer surfaces of the first and second substrates 11 and 21, respectively. Accordingly, radiation of heat to the outside from the outer surfaces of the first and second substrates 11 and 21 can be suppressed. In addition, heat conduction to the surroundings can be suppressed by forming the heat insulating space 42 around the chemical reaction apparatus 100. When the thin-film heater 22 heats the interior of the flow path 12, therefore, it is possible to suppress the thermal energy loss caused by a partial leak of the thermal energy to the outside, and thus, improve the energy utilization.

SECOND EMBODIMENT

Figure 4:
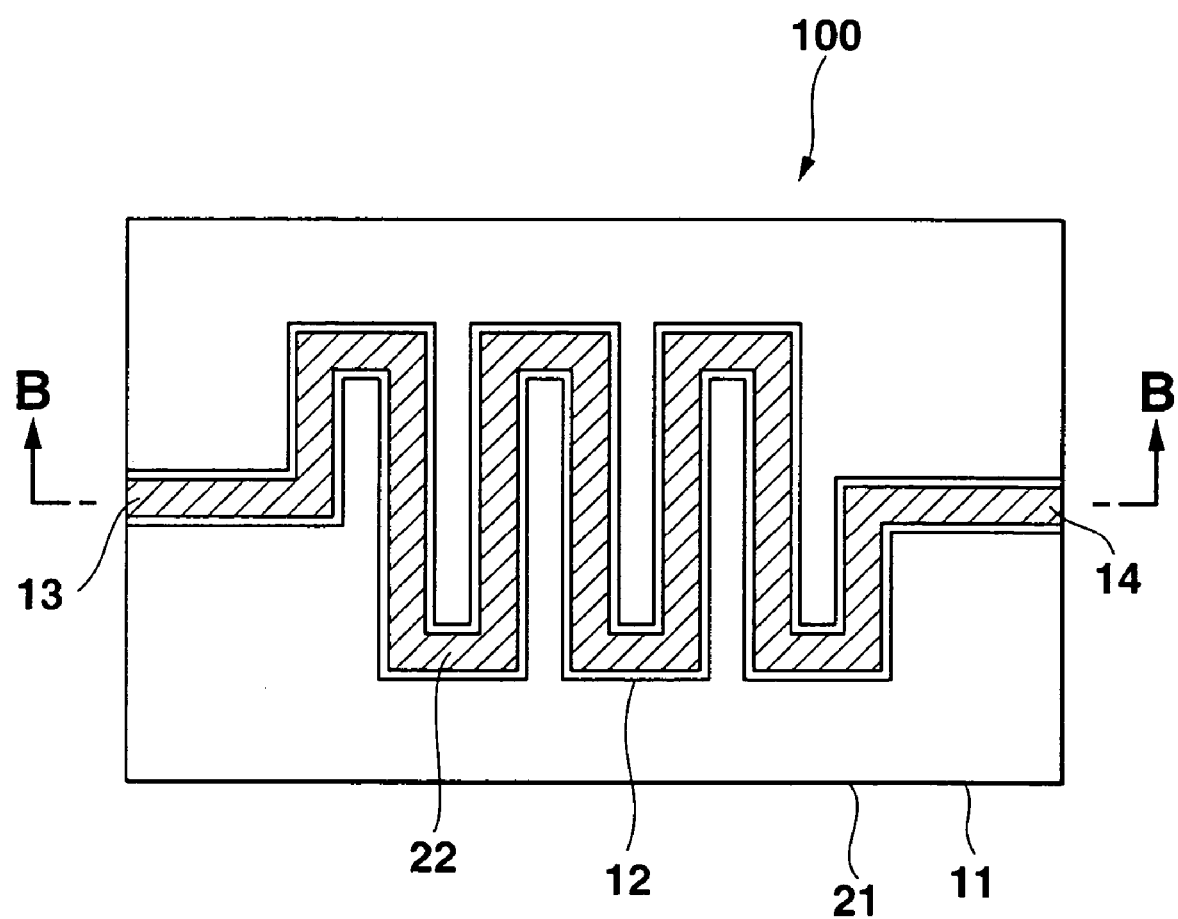
FIG. 4 is an opened-up plan view of the second embodiment of the chemical reaction apparatus according to the present invention.
Figure 5:
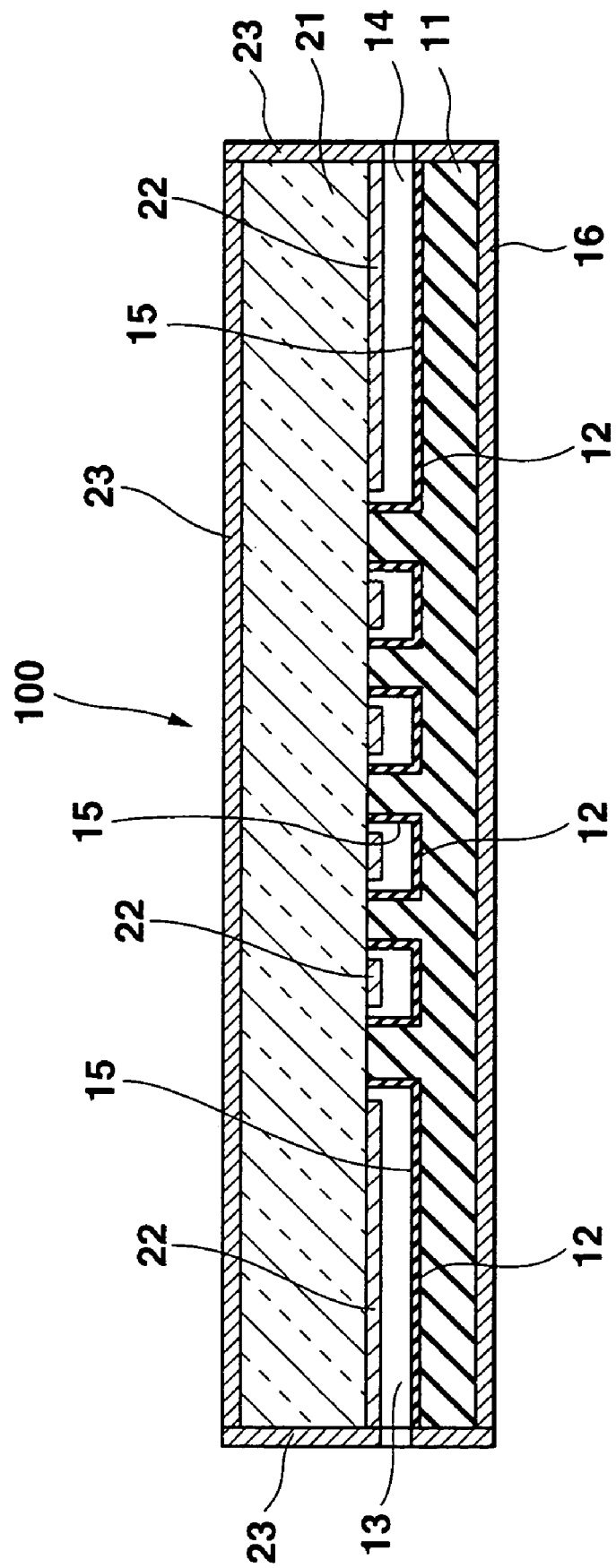
FIG. 5 is a sectional view of the second embodiment of the chemical reaction apparatus according to the present invention.

FIG. 4 is an opened-up plan view, similar to the first embodiment shown in FIG. 1, as the second embodiment of a chemical reaction apparatus 100 according to the present invention. FIG. 5 is a sectional view, similar to FIG. 2, taken along a line B-B of this chemical reaction apparatus 100.

The second embodiment differs from the arrangement of the first embodiment in that a thin-film heater 22 formed on that surface of a second substrate 21, which opposes a first substrate 11 is formed into a zigzagged shape corresponding to a flow path 12 as shown in FIG. 4, and this thin-film heater 22 has a width smaller than that of the flow path 12 so as to be accommodated in the flow path 12 as shown in FIG. 5.

In this arrangement, the thin-film heater 22 can be further approached to a reaction catalyst layer in the flow path 12, compared to the arrangement of the first embodiment described above. Therefore, the efficiency of supply of the thermal energy to the flow path 12 can be further increased, so the thermal energy utilization can be further increased.

In this second embodiment, the second substrate 21 is directly adhered (bonded) to one surface of the first substrate 11. These first and second substrates 11 and 21 may be adhered by using an adhesive, and may also be bonded by anodic bonding.

This anodic bonding process will be explained below.

The second substrate 21 is overlapped on the first substrate 11, and these first and second substrates 11 and 21 are used as an anode and cathode, respectively. While the first and second substrates 11 and 21 are heated to about 400 to 600° C., a DC voltage of about 1 kV is applied between the two electrodes. Consequently, cations as an impurity in the second substrate 21 move away from the first substrate 11, and a layer having a high oxygen ion concentration appears in that interface of the second substrate 21, which faces the first substrate 11. Accordingly, silicon atoms in that interface of the first substrate 11, which opposes the second substrate 21 and oxygen ions in that interface of the second substrate 21, which opposes the first substrate 11 are bonded, thereby forming a strong bonded interface.

In this process, when the first and second substrates 11 and 21 are heated to about 400 to 600° C. and a DC voltage of about 1 kV is applied between the two electrodes as described above, the speed at which cations as an impurity in the second substrate 21 move away from the first substrate 11 increases, so these cations can move within a short time period. This reduces the time required for the anodic bonding process.

When the first and second substrates 11 and 21 are bonded by anodic bonding as described above, strong bonding can be obtained. In addition, since no adhesive is necessary, no impurity such as an adhesive enters the flow path 12.

THIRD EMBODIMENT

Figure 6:
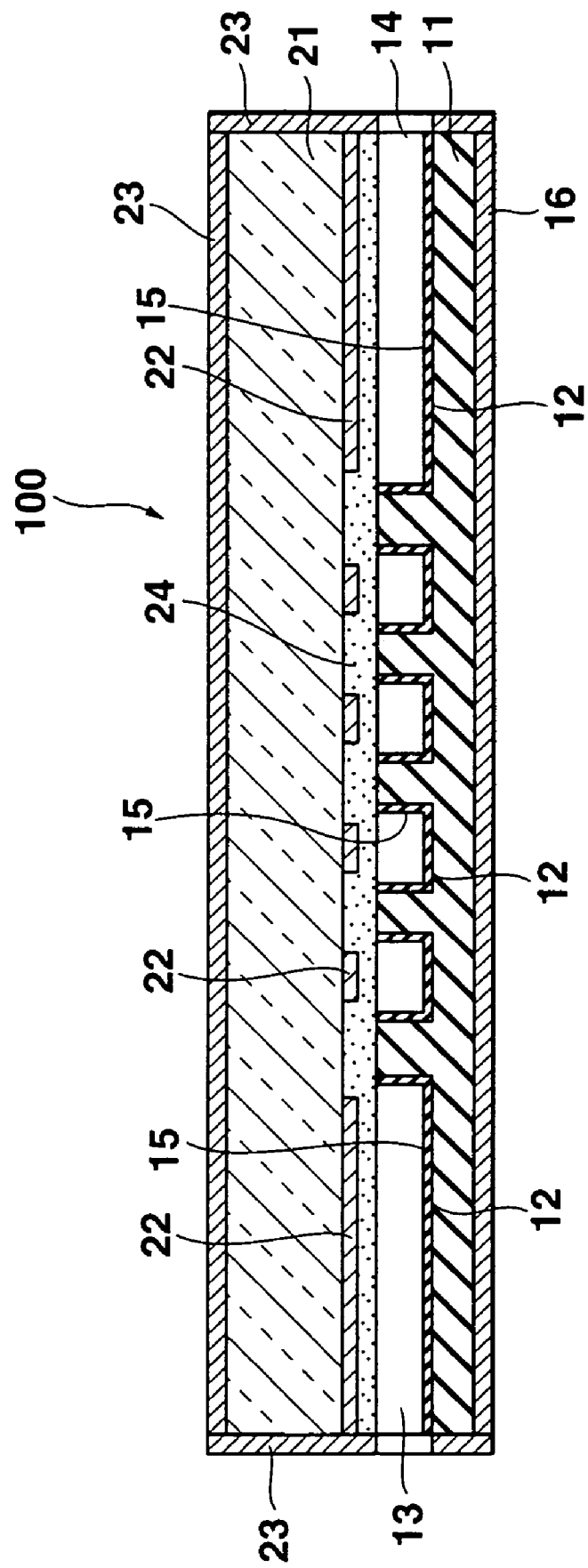
FIG. 6 is a sectional view of the third embodiment of the chemical reaction apparatus according to the present invention.

FIG. 6 is a sectional view, similar to FIG. 2, as the third embodiment of a chemical reaction apparatus 100 according to the present invention.

In this third embodiment, a thin-film heater 22 is formed on that surface of a second substrate 21, which faces a first substrate 11, as in the first embodiment described above. The third embodiment differs from the arrangement of the first embodiment in that an insulating film 24 made of silicon nitride or silicon oxide is additionally formed on that surface of the second substrate 21, which opposes the first substrate and includes the thin-film heater 22 embedded in the film 24, thereby forming a flat surface including the thin-film heater 22 on that surface of the second substrate 21, which opposes the first substrate 11.

As in the second embodiment described above, the thin-film heater 22 is formed into a zigzagged shape corresponding to a flow path 12. The second substrate 21 is adhered (bonded) to one surface of the first substrate 11 via the insulating film 24.

FIG. 6 shows an arrangement in which the width of the thin-film heater 22 is made smaller than that of the flow path 12, but the present invention is not limited to this arrangement. In this third embodiment, the thin-film heater 22 is formed outside the zigzagged flow path 12, so the width of this thin-film heater 22 may be made equal to that of the flow path 12. Alternatively, the thin-film heater 22 may be made wider than the flow path 12 so as to substantially cover the entire flow path 12. Furthermore, the thin-film heater 22 may be formed into a rectangular shape so as to cover the whole flow path 12, as in the first embodiment shown in FIG. 1.

With the arrangement of the third embodiment, the thermal energy can be efficiently supplied from the thin-film heater 22 to the flow path 12 by arranging the thin-film heater 22 and flow path 12 close to each other. In addition, since the thin-film heater 22 is covered with the insulating film 24, a fluid flowing in the flow path 12 is not in direct contact with the thin-film heater 22. This avoids corrosion and deterioration of the thin-film heater 22 by the influence of the fluid flowing in the flow path 12.

FOURTH EMBODIMENT

Figure 7:
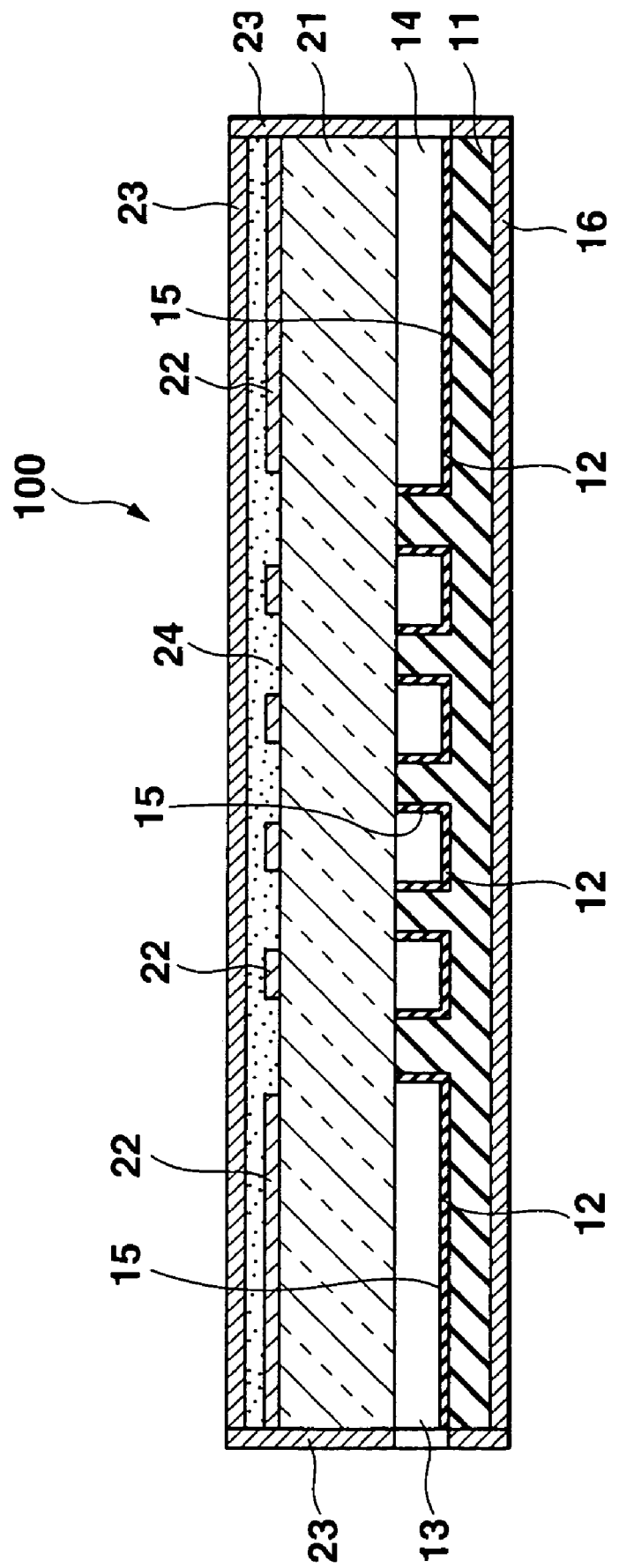
FIG. 7 is a sectional view of the fourth embodiment of the chemical reaction apparatus according to the present invention.

FIG. 7 is a sectional view, similar to FIG. 2, as the fourth embodiment of a chemical reaction apparatus 100 according to the present invention.

This fourth embodiment differs from the arrangement of the third embodiment in that a thin-film heater 22 is formed on the outer surface or upper surface of a second substrate 21, and an insulating film 24 is formed on the outer surface of the second substrate 21 so as to cover the thin-film heater 22, thereby forming a flat upper surface including this thin-film heater 22, and that a heat radiation preventing film 23 is formed on this flat outer surface or upper surface of the insulating film 24.

In this arrangement, the thin-film heater 22 is formed into a zigzagged shape corresponding to a flow path 12, as in the second embodiment described above. FIG. 7 shows an arrangement in which the width of the thin-film heater 22 is made smaller than that of the flow path 12, but the present invention is not limited to this arrangement.

Since the thin-film heater 22 is formed outside the zigzagged flow path 12, the width of the thin-film heater 22 may be made substantially equal to that of the flow path 12, or the thin-film heater 22 may be made wider than the flow path 12. Furthermore, the thin-film heater 22 may be formed into a rectangular shape covering the whole flow path 12, as in the first embodiment shown in FIG. 1.

In this fourth embodiment, the heat radiation preventing film 23 is formed on the outer surface or upper surface of the insulating film 24. This heat radiation preventing film 23 prevents radiation of heat from the thin-film heater 22 to the outside, and protects the thin-film heater 22.

FIFTH EMBODIMENT

Figure 8:
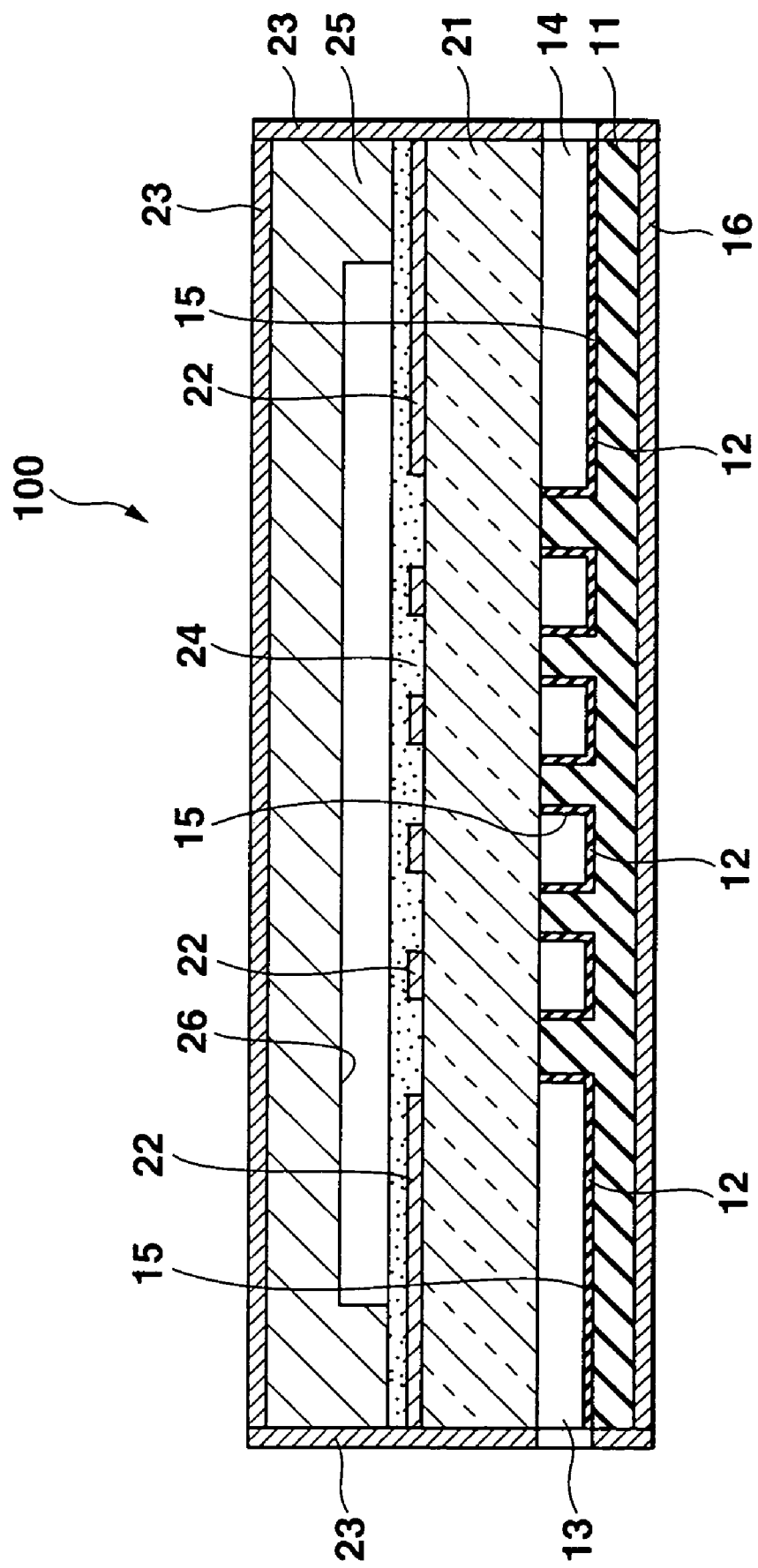
FIG. 8 is a sectional view of the fifth embodiment of the chemical reaction apparatus according to the present invention.

FIG. 8 is a sectional view, similar to FIG. 2, as the fifth embodiment of a chemical reaction apparatus 100 according to the present invention.

The fifth embodiment differs from the arrangement of the fourth embodiment in that the formation position of a heat radiation preventing film 23 is changed, and a rectangular, plate-like third substrate 25 is adhered (bonded) to the outer surface of an insulating film 24.

This third substrate 25 has, e.g., a rectangular recess 26 in a central portion of the surface opposite to the outer surface of the insulating film 24, or of the lower surface. A peripheral portion around the recess 26 of the third substrate 25 is adhered (bonded) to the outer surface of the insulating film 24. This third substrate 25 is made of glass or aluminum. The heat radiation preventing film 23 is formed on the entire outer surfaces (side surfaces and upper surface) of the third substrate 25.

In this arrangement, the third substrate 25 further protects a thin-film heater 22. Also, in addition to suppression of the thermal energy loss by the heat radiation preventing film 23, heat diffusion from the thin-film heater 22 is further suppressed by the heat insulating function of the recess 26, so the heating efficiency can be further increased. For this purpose, a gas such as air, freon, or carbonic acid gas having thermal conductivity lower than that of the third substrate 25 may be sealed in the recess 26 of the third substrate 25, closed by the insulating film, thereby improving the heat insulating performance. The heat insulating performance may also be further improved by setting a substantially vacuum state in the recess 26 of the third substrate 25.

Where the recess 26 is vacuumed, the lower the pressure in the recess 26 is, the higher the insulating efficiency is. Practically, for example, the pressure in the recess 26 may be set to about 100 Pa, or set to a value lower than about 100 Pa, and preferably, set to about 10 Pa, or set to a value lower than about 10 Pa, so that the power applied to the thin-film heater 22 may be decreased.

SIXTH EMBODIMENT

Figure 9:
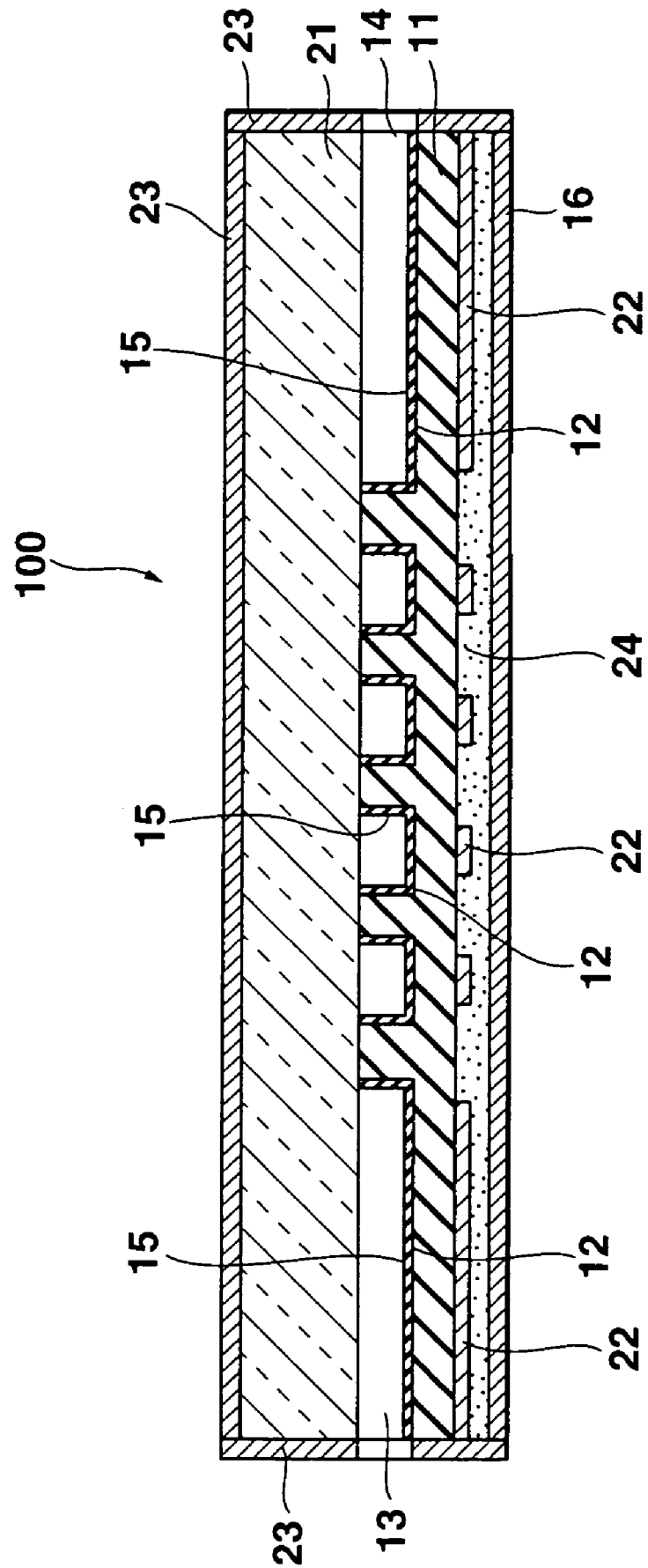
FIG. 9 is a sectional view of the sixth embodiment of the chemical reaction apparatus according to the present invention.

FIG. 9 is a sectional view, similar to FIG. 2, as the sixth embodiment of a chemical reaction apparatus 100 according to the present invention.

This sixth embodiment differs from the first embodiment shown in FIG. 2 in that a thin-film heater 22 is formed on the outer surface or lower surface of a first substrate 11, and an insulating film 24 is formed on that outer surface of the first substrate 11, which covers the thin-film heater 22, thereby forming a flat insulating film surface including the thin-film heater 22 on the outer surface of the first substrate 11, and that a heat radiation preventing film 16 is formed on the outer surface or lower surface of the insulating film 24.

In this arrangement, as in the second embodiment described earlier, the thin-film heater 22 is formed into a zigzagged shape corresponding to a flow path 12. FIG. 9 shows an arrangement in which the width of the thin-film heater 22 is made narrower than that of the flow path 12, but the present invention is not limited to this arrangement. Since the thin-film heater 22 is formed outside the zigzagged flow path 12, the width of this thin-film heater 22 may be made substantially equal to that of the flow path 12, or the thin-film heater 22 may be made wider than the flow path 12. Furthermore, as in the first embodiment shown in FIG. 1, the thin-film heater 22 may be formed into a rectangular shape which covers the whole flow path 12.

In this sixth embodiment, the heat radiation preventing film 16 is formed on the outer surface of the insulating film 24. The heat radiation preventing film 16 prevents radiation of heat from the thin-film heater 22 to the outside, and protects the thin-film heater 22.

SEVENTH EMBODIMENT

Figure 10:
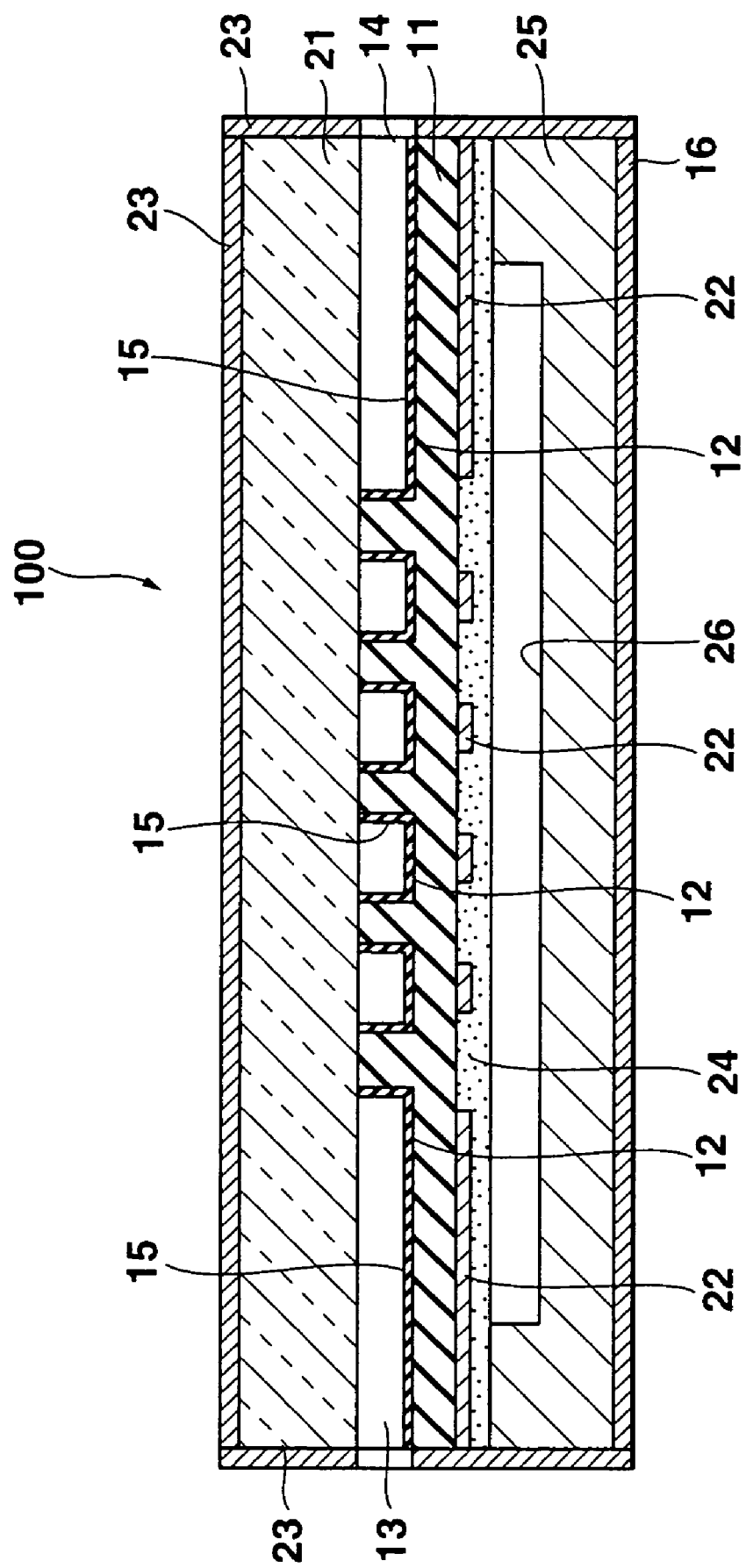
FIG. 10 is a sectional view of the seventh embodiment of the chemical reaction apparatus according to the present invention.

FIG. 10 is a sectional view, similar to FIG. 4, as the seventh embodiment of a chemical reaction apparatus 100 according to the present invention.

In this seventh embodiment, a third substrate 25 is adhered (bonded) to a flat outer surface of an insulating film 24 in addition to the arrangement of the sixth embodiment shown in FIG. 9.

This third substrate 25 has a recess 26 in a central portion of the surface opposite to the outer surface of the insulating film 24. A peripheral portion of the third substrate 25 is adhered (bonded) to the outer surface of the insulating film 24. The third substrate 25 is made of glass or aluminum. A heat radiation preventing film 16 is formed on the outer surface of the third substrate 25.

In this arrangement, like the arrangement shown in FIG. 8, the third substrate 25 further protects a thin-film heater 22, and also, in addition to suppression of the thermal energy loss by the heat radiation preventing film 16, heat diffusion from the thin-film heater 22 is further suppressed by the heat insulating function of the recess 26, so the heating efficiency can be further increased. For this purpose, a gas such as air, freon, or carbonic acid gas having thermal conductivity lower than that of the third substrate 25 may be sealed in the recess 26 of the third substrate 25, thereby improving the heat insulating performance. The heat insulating performance may also be further improved by setting a substantially vacuum state in the recess 26 of the third substrate 25.

In each of the first to seventh embodiments described above, one thin-film heater 22 is formed. However, the present invention is not limited to these embodiments, and the embodiments may also be appropriately combined. For example, thin-film heaters 22 may be formed on the two sides of the flow path 12, i.e., on the lower surface of the first substrate and on the lower or upper surface of the second substrate. When the two thin-film heaters 22 are thus formed to sandwich the flow path 12 between them, the interior of the flow path 12 can be heated to a higher temperature by heat generated by these heaters. Therefore, this arrangement is suited to a case in which a chemical reaction in the flow path 12 requires a higher temperature.

EIGHTH EMBODIMENT

Figure 11:
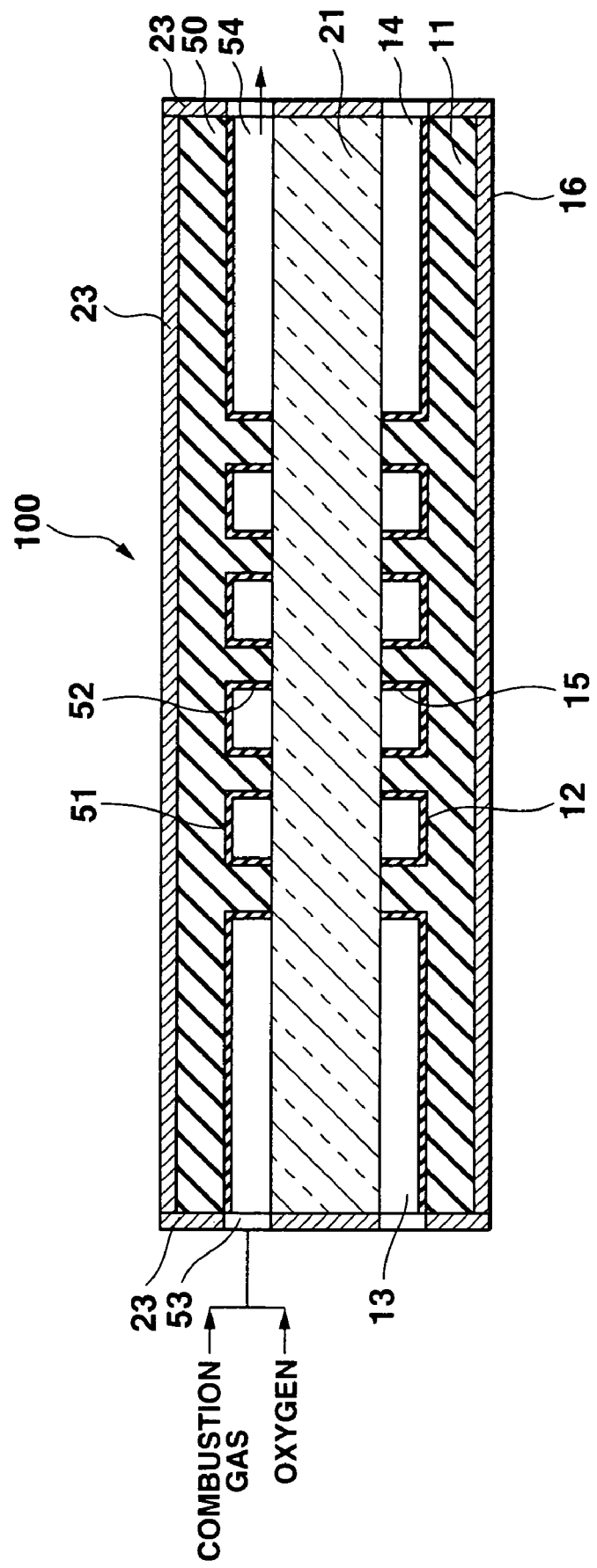
FIG. 11 is a sectional view of the eighth embodiment of the chemical reaction apparatus according to the present invention.

FIG. 11 is a sectional view, similar to FIG. 2, as the eighth embodiment of a chemical reaction apparatus 100 according to the present invention.

A heating element of the present invention need only be capable of heating a flow path 12 to a predetermined temperature, thereby supplying a predetermined thermal energy to a reaction catalyst layer 15 in the flow path 12 or to a fluid flowing in the flow path 12. In the first to seventh embodiments, a thin-film heater is used as this heating element. Instead of using this thin-film heater as the heating element, it is also possible to use, e.g., thermal energy generated by a combustion reaction using a combustion catalyst layer.

In this eighth embodiment, a combustion catalyst layer is used as the heating element.

Similar to each of the above embodiments, the apparatus shown in FIG. 11 includes a first substrate 11 having a zigzagged flow path 12 formed in its one surface, a second substrate 21 adhered (bonded) to this surface of the first substrate 11 to function as a lid, and a combustion substrate 50 provided on the second substrate 21. A combustion flow path 51 is formed in the combustion substrate 50, and a combustion catalyst layer 52 is formed on at least a portion of the inner wall surfaces of this combustion flow path 51. The combustion catalyst layer 52 is made of, e.g., Pt, Au, or Ag.

In this eighth embodiment, when a combustion fluid of a combustion gas, for example, hydrogen, and oxygen taken from the atmosphere is supplied into the combustion path 51 through an inlet port 53 as indicated by an arrow, this supplied combustion fluid combusts by a combustion reaction on the combustion catalyst layer 52, and thermal energy is generated by this combustion. The combusted gas is discharged to the atmosphere from an outlet port 54, as shown in an arrow. This apparatus has a structure in which the thermal energy generated by this combustion is supplied to a reaction catalyst layer 15 in the flow path 12.

In this arrangement, as in each of the above embodiments, a heat radiation preventing film 23 can be formed on the outer surfaces (upper surface and side surfaces) of the combustion substrate 50. This makes it possible to suppress radiation of heat from the outer surfaces of the combustion substrate 50, suppress the thermal energy loss, and increase the energy utilization.

<Power Supply System>

An arrangement in which the chemical reaction apparatus according to the present invention is applied to a power supply system using a fuel reforming type fuel cell will be described below.

Figure 12:
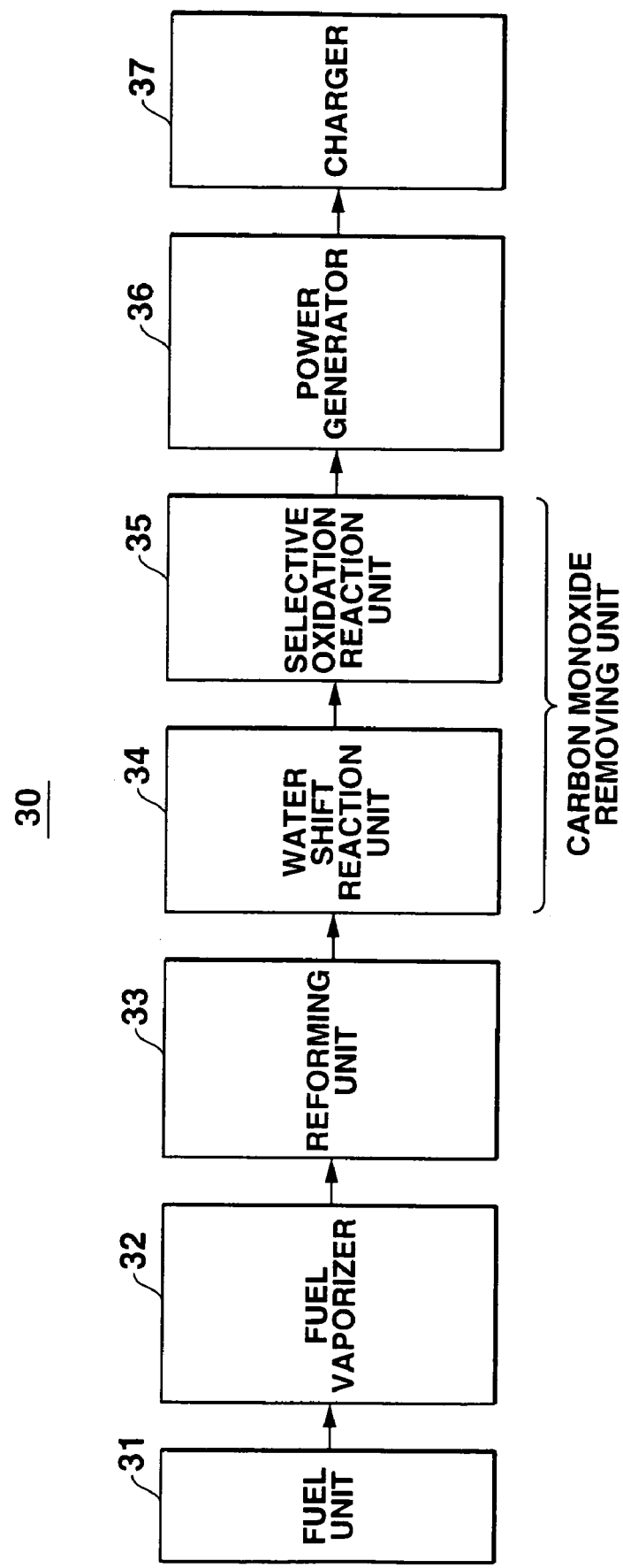
FIG. 12 is a block diagram showing an outline of the arrangement of a power supply system using a fuel cell, to which the chemical reaction apparatus according to the present invention is applied.

FIG. 12 is a block diagram showing an outline of the arrangement of a power supply system 30 using a fuel cell. This power supply system 30 comprises a fuel unit 31, fuel vaporizer (vaporizing unit) 32, reforming unit 33, water shift reaction unit 34, selective oxidation reaction unit 35, power generator 36, and charger 37. Of these units, the chemical reaction apparatus 100 having the arrangement of any embodiment described above can be applied to the fuel vaporizer 32, reforming unit 33, water shift reaction unit 34, and selective oxidation reaction unit 35.

The fuel unit 31 includes a fuel pack in which power generation fuel, e.g., an aqueous solution of methanol ($CH_3OH+H_2O$) is sealed, and a fuel pump, and supplies the power generation fuel to the fuel vaporizer 32.

The fuel vaporizer 32 vaporizes the power generation fuel supplied from the fuel unit 31. When the chemical reaction apparatus 100 having the arrangement of any embodiment described above is applied to this fuel vaporizer 32, no reaction catalyst layer 15 is formed in the flow path 12. Also, a glass substrate or aluminum substrate may be used as the first substrate 11 instead of a silicon substrate. When the power generation fuel is supplied from the fuel unit 31 into the flow path 12 of the fuel vaporizer 32 through the inlet port 13, this power generation fuel is vaporized as it is heated to a predetermined temperature, e.g., about 120° C. in the flow path 12 by the thin-film heater 22. The vaporized power generation fuel gas is discharged from the outlet port 14 and supplied to the reforming unit 33.

The reforming unit 33 produces hydrogen by reforming the power generation fuel gas supplied from the fuel vaporizer 32. When the chemical reaction apparatus 100 having the arrangement of any embodiment described above is applied to this reforming unit 33, a reaction catalyst layer 15 for reforming is provided in the flow path 12 of the first substrate 11. The reaction catalyst layer 15 is made of a reforming catalyst such as Cu, ZnO, or $Al_2O_3$. As the first substrate 11, a glass substrate may also be used instead of a silicon substrate. When the power generation fuel gas (e.g., an aqueous solution of methanol: $CH_3OH+H_2O$) is supplied from the fuel vaporizer 32 into the flow path 12 of the reforming unit 33 through the inlet port 13, this power generation fuel gas is heated to a predetermined temperature, e.g., about 280° C. in the flow path 12 by the thin-film heater 22. This induces an endothermic reaction as indicated by

$$CH_3OH+H_2O \rightarrow 3H_2+CO_2 \quad (1)$$

and produces hydrogen and carbon dioxide as a byproduct. In the initial stages of this reaction, water ($H_2O$) on the left side of formula (1) above may be water contained in the fuel in the fuel unit 31. It is also possible to collect water produced when the power generator 36 to be described later generates electric power, and supply this water to the reforming unit 33. The supply source of water ($H_2O$) on the left side of formula (1) in the reforming unit 33 may be the power generator 36 alone, both the power generator 36 and fuel unit 31, or the fuel unit 31 alone. During the reaction, carbon monoxide is sometimes produced, albeit in a slight amount, in the reforming unit 33 as in a chemical reaction formula indicated by

$$2CH_3OH+H_2O \rightarrow 5H_2+CO+CO_2 \quad (2)$$

The products (hydrogen and carbon dioxide) on the right side of formula (2) above and the slight amount of carbon monoxide are discharged from the outlet port 14 of the reforming unit 33. Of the products discharged from the outlet port 14 of the reforming unit 33, the vaporized hydrogen and carbon monoxide are supplied to the water shift reaction unit 34 and selective oxidation reaction unit 35 in this order. The carbon dioxide is separated and discharged to the atmosphere.

The water shift reaction unit 34 and selective oxidation reaction unit 35 form a carbon monoxide removing unit 38 which removes carbon monoxide produced by the reforming unit 33. When the chemical reaction apparatus 100 having the arrangement of any embodiment described above is applied to this water shift reaction unit 34, a reaction catalyst layer 15 for removing carbon monoxide is provided in the flow path 12 of the first substrate 11. This reaction catalyst layer 15 is made of a selective oxidation catalyst such as Pt or $Al_2O_3$. As the first substrate 11, a glass substrate or the like may also be used instead of a silicon substrate. When the vaporized hydrogen and carbon monoxide are supplied from the reforming unit 33 into the flow path 12 of the water shift reaction unit 34 through the inlet port 13, these vaporized hydrogen and carbon monoxide are heated to a predetermined temperature, e.g., about 180° C. by the thin-film heater 22. Consequently, of the hydrogen, carbon monoxide, and water supplied into the flow path 12, the carbon monoxide and water cause a water shift reaction with the catalyst to produce hydrogen and carbon dioxide as a byproduct as indicated by $$CO + H_2O \rightarrow H_2 + CO_2 \quad (3)$$

In the initial stages of this reaction, water ($H_2O$) on the left side of formula (3) above may be water contained in the fuel in the fuel unit 31. It is also possible to collect water produced when the power generator 36 generates electric power, and supply this water to the water shift reaction unit 34. The supply source of water ($H_2O$) on the left side of formula (3) in the water shift reaction unit 34 may be the power generator 36 alone, both the power generator 36 and fuel unit 31, or the fuel unit 31 alone.

The selective oxidation reaction unit 35 performs a heat treatment for the gas mixture supplied from the water shift reaction unit 34. If a very slight amount of carbon monoxide is contained in this gas mixture supplied from the water shift reaction unit 34, the selective oxidation reaction unit 35 selects the residual carbon monoxide by a catalyst, and brings the selected carbon monoxide into contact with oxygen taken from the atmosphere, thereby reliably removing the carbon monoxide by producing carbon dioxide by a chemical reaction indicated by $$CO + (1/2)O_2 \rightarrow CO_2 \quad (4)$$

The fluid finally reaching the outlet port 14 of the selective oxidation reaction unit 35 mostly consists of hydrogen and carbon dioxide.

The products after the series of reactions described above are hydrogen and carbon dioxide. Of these products, the carbon dioxide is separated from the hydrogen and discharged to the atmosphere. Accordingly, only the hydrogen is supplied from the selective oxidation reaction unit 35 to the power generator 36.

Figure 13:
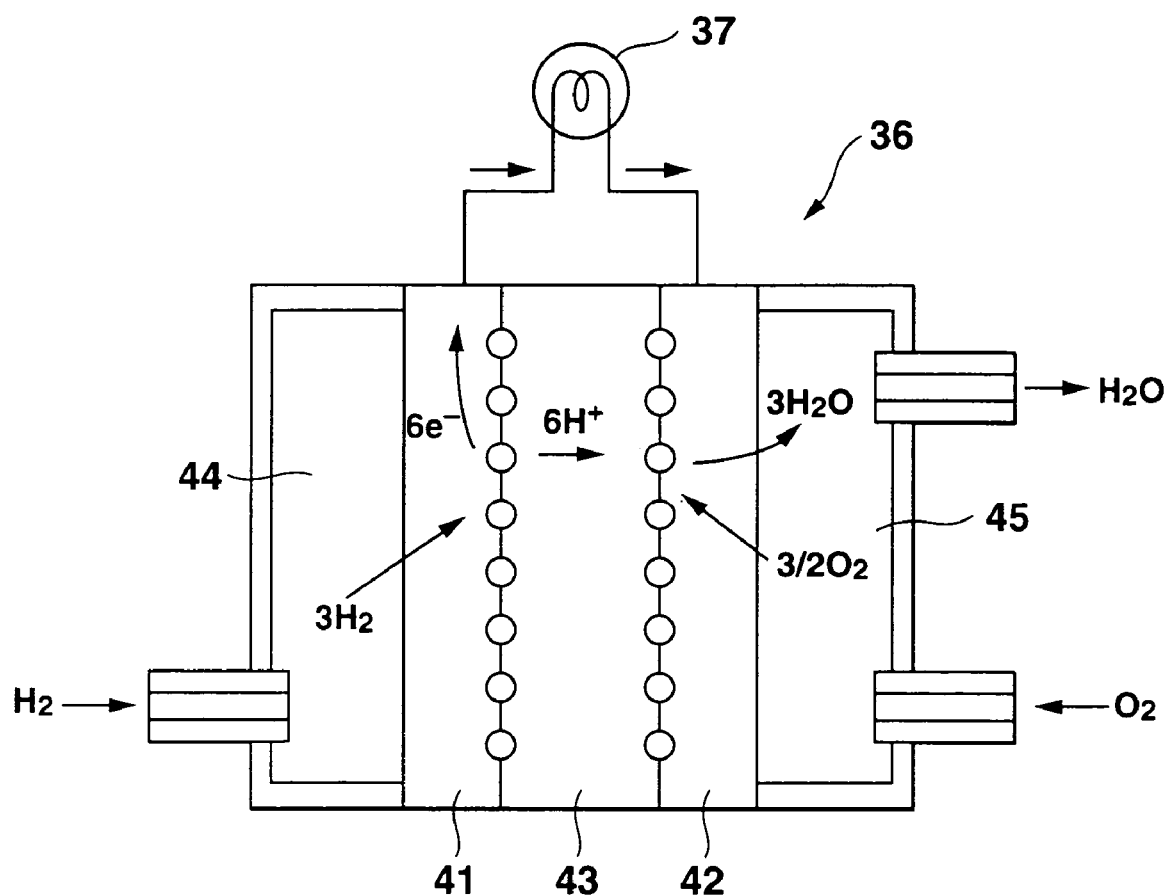
FIG. 13 is a schematic view showing the arrangement of a polymer electrolyte fuel cell applied to the fuel cell to which the chemical reaction apparatus according to the present invention is applied.

FIG. 13 shows an outline of the arrangement of a solid polymer electrolyte fuel cell applied to the power generator 36. The power generator 36 has a cathode 41 which is a carbon electrode to which a catalyst such as Pt or C is adhered, an anode 42 which is a carbon electrode to which a catalyst such as Pt, Ru, or C is adhered, and an ion conductive film 43 interposed between the cathode 41 and anode 42, and supplies electric power to the charger 37 positioned between the cathode 41 and anode 42.

A space 44 is formed outside the cathode 41. Hydrogen is supplied into the space 44 from the carbon monoxide removing unit 38, and this hydrogen is supplied to the cathode 41. Also, a space 45 is formed outside the anode 42. Oxygen taken from the atmosphere via a check valve is supplied into this space 45, and this oxygen is supplied to the anode 42.

On the side of the cathode 41, hydrogen ions (protons; $H^+$) are generated by separating electrons ($e^-$) from hydrogen and move to the anode 42 through the ion conductive film 43, and the electrons ($e^-$) are extracted by the cathode 41 and supplied to the charger 37, as indicated by $$3H_2 \rightarrow 6H^+ + 6e^- \quad (4)$$

On the side of the anode 42, the electrons ($e^-$) supplied via the charger 37, the hydrogen ions ($H^+$) passing through the ion conductive film 43, and oxygen react with each other to produce water as a byproduct, as indicated by $$6H^+ + (3/2)O_2 + 6e^- \rightarrow 3H_2O \quad (5)$$

The series of electrochemical reactions (formulas (4) and (5)) as described above progress in an environment at a relatively low temperature from about room temperature to about 80° C., and the only byproduct except for electric power is basically water. This water produced as a byproduct by the power generator 36 is collected. If at least a portion of the water produced by the power generator 36 is supplied to the reforming unit 33 as described previously, the amount of water initially sealed in the fuel unit 31 can be reduced, and the amount of water to be collected can also be reduced.

The electric power thus generated by the power generator 36 is supplied to the charger 37. The charger 37 includes a power holding means such as a secondary battery or capacitor, and charges this secondary battery or capacitor with the electric power supplied from the power generator 36, thereby temporarily holding the supplied power. In addition, the charger 37 supplies the held electric power to an apparatus which is driven by this power supply system.

Fuel applied to a fuel reforming type fuel cell currently being researched and developed is liquid fuel, liquefied fuel, or gas fuel containing at least a hydrogen element. This fuel need only be fuel with which the power generator 36 can generate electric energy at a relatively high energy conversion efficiency. In addition to methanol described above, it is possible to preferably use alcohol-based liquid fuel such as ethanol or butanol, liquid fuel such as dimethylether, isobutane, or natural gas (CNG) which is vaporized at room temperature and atmospheric pressure and made of hydrocarbon, or gas fuel such as hydrogen gas.

Figure 14:
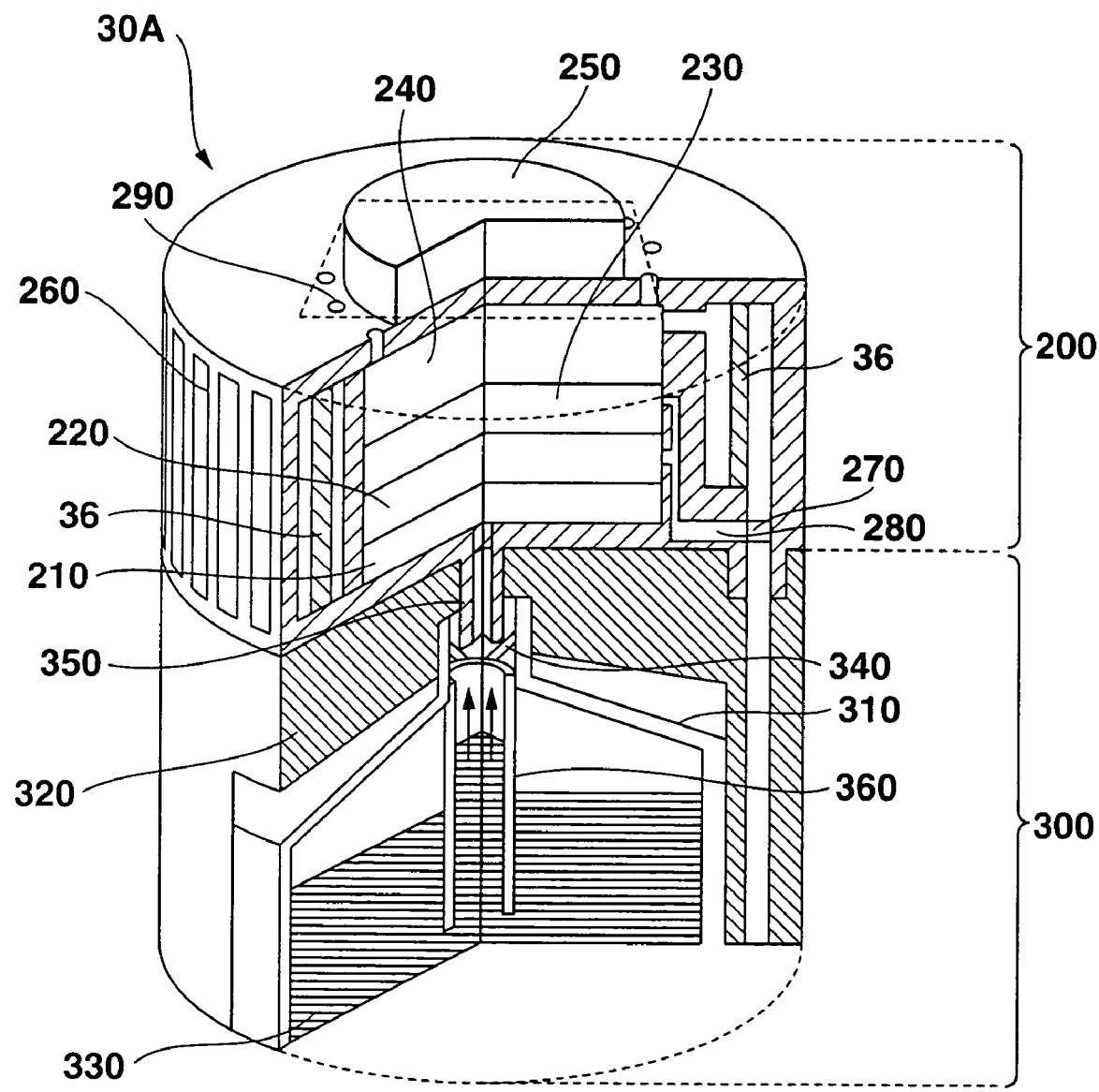
FIG. 14 is a schematic view showing the main parts of a practical arrangement of the whole power supply system using the fuel cell, to which the chemical reaction apparatus according to the present invention is applied.
Figure 15:
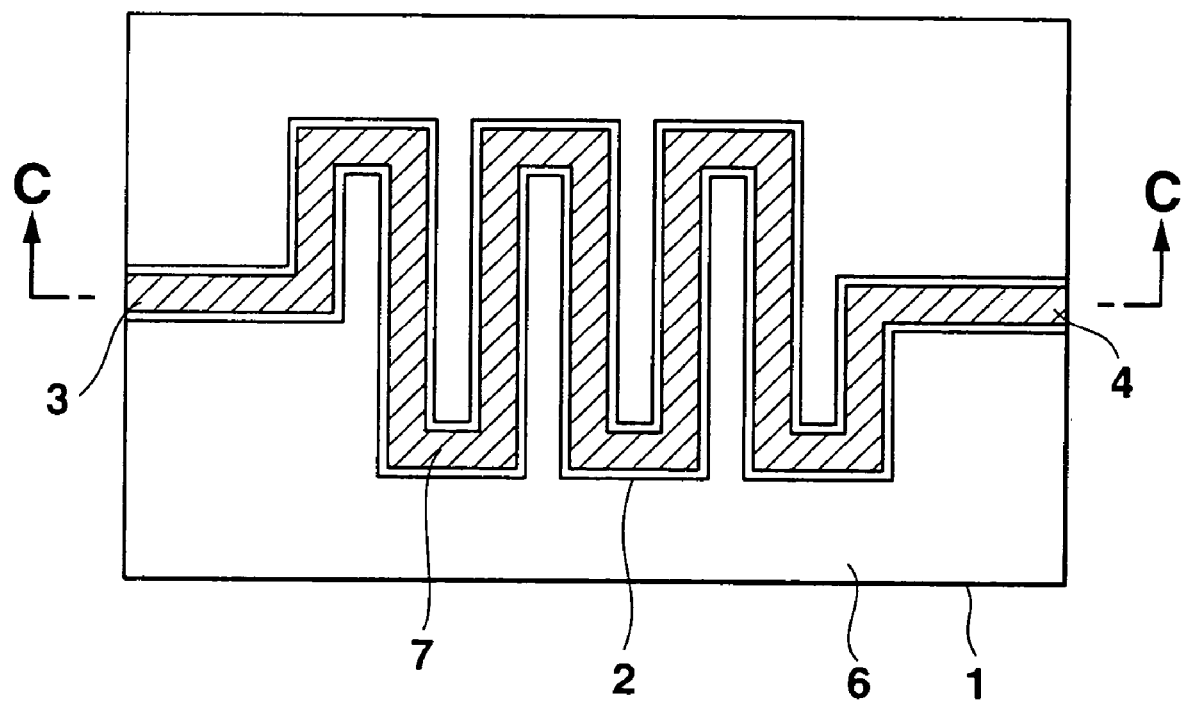
FIG. 15 is an opened-up plan view of an example of the conventional chemical reaction apparatus.
Figure 16:
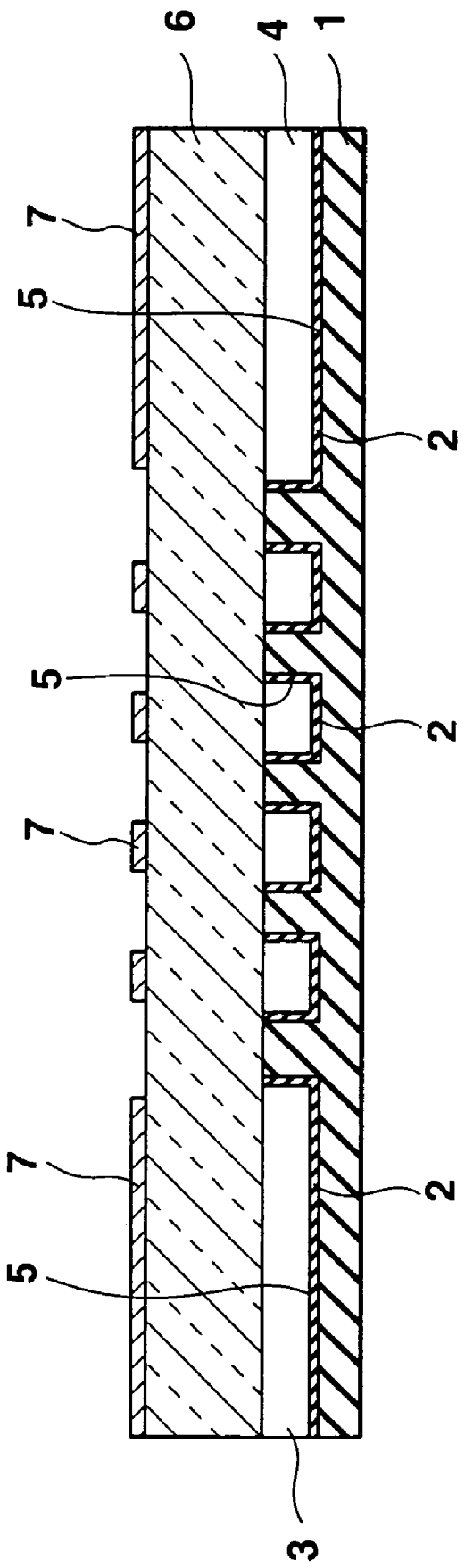
FIG. 16 is a sectional view of the example of the conventional chemical reaction apparatus.

FIG. 14 is a schematic view showing the main parts of a practical arrangement when a power supply system using a fuel cell to which the chemical reaction apparatus according to the present invention is applied is formed as one module. FIG. 14 shows merely an example of an application of the chemical reaction apparatus according to the present invention, and hence does not limit the scope of the invention at all.

In FIG. 14, a power supply system 30A includes a fuel reforming type fuel cell and the components indicated by the blocks shown in FIG. 12. The same reference numbers as in FIG. 12 denote the same parts in FIG. 14, and an explanation thereof will be omitted or simplified.

As shown in FIG. 14, the power supply system 30A has, e.g., a columnar outer shape equivalent to a general-purpose chemical cell. It can be understood that the outer shape is not limited to this one, and another appropriate shape can be used in accordance with the use, capacity, and the like.

As shown in FIG. 14, the power supply system 30A according to this practical arrangement roughly divided into a power generating unit 200 and fuel supply unit 300. The fuel supply unit 300 corresponds to the fuel unit 31 shown in FIG. 12, and includes a fuel vessel or fuel pack 310, a holder unit 320 to which the fuel vessel 310 is detachably attached, a fuel pump (not shown), and the like. The fuel pack 310 is filled with power generation fuel 330, and has a fuel supply valve 340 for preventing a leak of the power generation fuel 330 in a portion connected to the holder unit 320.

When this fuel pack 310 is connected to the holder unit 320, a fuel delivery pipe 350 provided to in the holder unit 320 pushes the fuel supply valve 340 downward, and the power generation fuel 330 is delivered from a fuel supply pipe 360 to the power generating unit 200 via the fuel delivery pipe 350 by the surface tension or the fuel pump.

The power generating unit 200 includes components corresponding to the fuel vaporizer 32, reforming unit 33, water shift reaction unit 34, selective oxidation reaction unit 35, power generator 36, and charger 37 shown in FIG. 12. The chemical reaction apparatus 100 of any embodiment described above is applied to the fuel vaporizer 32, reforming unit 33, water shift reaction unit 34, and selective oxidation reaction unit 35. In this apparatus, a flow path having a depth and width of 500 μm or less is formed using, e.g., the micromachine manufacturing technology, thereby forming a microspace. More specifically, as shown in FIG. 14, the power generator 36 is extended along the inner surface of a cylindrical inner wall which is coaxially fixed with a predetermined spacing to the inside of a cylindrical outer wall forming a housing. The fuel vaporizer 32, reforming unit 33, water shift reaction unit 34, and selective oxidation reaction unit 35 are formed in a fuel vaporizer formation frame 210, reforming unit formation frame 220, water shift reaction unit formation frame 230, and selective oxidation reaction unit formation frame 240, respectively, each of which is formed in the internal space of the power generating unit 200. Each formation frame corresponds to the support member 40 shown in FIG. 3, and each chemical reaction apparatus is formed in a corresponding formation frame with a predetermined space between them. These formation frames may be separated from each other by partitions, or may also be formed as one frame in which the fuel vaporizer 32, reforming unit 33, water shift reaction unit 34, and selective oxidation reaction unit 35 are stacked. The heat insulating performance can be improved by sealing, in the space of each formation frame, a gas such as air, freon, or carbonic acid gas having thermal conductivity lower than that of the constituent members of the formation frame. The heat insulating performance may be further improved by setting a substantially vacuum state in this space, like the arrangement shown in FIG. 3. To avoid complexity of the drawing, FIG. 14 shows only the individual formation frames.

The charger 37 is formed into a microchip or the like and placed in, e.g., a projecting terminal 250 or another space in the power generating unit 200.

The power generating unit 200 includes a plurality of ventilation holes (slits) 260 for supplying external air from the circumferential surface of the column of the power generating unit 200 to the anode 42 (FIG. 13) of the power generator 36, a separating/collecting unit 270 for liquefying (condensating) byproducts (e.g., water) produced on the anode 42, thereby separating and collecting the byproducts, a byproduct supply path 280 for supplying a portion of the collected byproducts to the reforming unit 33 and water shift reaction unit 34, and an exhaust hole 290 which extends from the column upper surface to the space 44 in the power generator 36, and exhausts to the outside a byproduct (e.g., carbon dioxide) which is produced in at least the cathode 41 of the power generator 36, the reforming unit 33, and the selective oxidation reaction unit 35, and which is a material not to be collected.

In the power supply system having the above arrangement, the chemical reaction apparatus 100 of the present invention is applied to the fuel vaporizer 32, reforming unit 33, water shift reaction unit 34, and selective oxidation reaction unit 35. This increases the utilization of the thermal energy required to heat the flow path, and downsizes the power generating unit 200.

In the present invention as has been explained above, a chemical reaction apparatus including a heating element for heating a flow path has a heat radiation preventing film which covers the outermost surfaces of the chemical reaction apparatus. This heat radiation preventing film can suppress radiation of heat from the outer surfaces of each substrate. Accordingly, it is possible to suppress the thermal energy loss when the heating element heats the interior of the flow path, and increase the energy utilization.

Furthermore, this chemical reaction apparatus is well applicable to a fuel vaporizer, reforming unit, or carbon monoxide removing unit of a power supply system using a fuel reforming type fuel cell. In this case, the heat radiation preventing film suppresses the loss of the thermal energy required for heating for power generation, and increases the energy utilization. As a consequence, the power supply system can be downsized.

In each embodiment, a means which generates thermal energy by an electrical or combustion reaction is used as the heating element or heater for heating the flow path to allow a reaction of the internal chemical medium to occur. However, it can be understood that it is also possible to use another means for generating thermal energy by, e.g., a physical or chemical principle, such as electromagnetic waves.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A chemical reaction apparatus comprising:
a plurality of substrates which are bonded to each other and which are heatable;
at least one flow path which is formed in at least one of the plurality of substrates, and through which a fluid flows, the flow path including an inlet opening and an outlet opening which are exposed on an outermost surface of the at least one of the plurality of substrates;
a heating element which is formed on at least one surface of at least one of the plurality of substrates to heat said plurality of substrates and to heat the flow path to a predetermined temperature so that a chemical reaction of the fluid flowing through the flow path is accelerated; and
a heat radiation preventing film which contacts and covers at least a portion of one of: (i) the outermost surface of the at least one of the plurality of substrates and (ii) an outermost surface of the heating element to reflect at least a part of heat rays reflected from said outermost surfaces to thereby prevent lowering of a temperature of the flow path;
wherein the heat radiation preventing film comprises at least one of: (i) a metal film made of Au, Al, or Ag, and (ii) a metal oxide film made of $SnO_2$, $InO_3$, or ZnO;

wherein the plurality of substrates include at least a first substrate having a first surface in which the flow path is formed, and a second substrate bonded to the first surface of the first substrate;

wherein the heating element comprises a thin-film heater, and the thin-film heater is formed on at least one of: a first surface of the second substrate that opposes the first substrate, a second surface of the second substrate away from the first surface of the second substrate, and a second surface of the first substrate away from the first surface of the first substrate;

wherein the heating element further comprises an electrically insulating film provided on the surface on which the thin-film heater is formed, and the electrically insulating film covers the thin-film heater and has a flat surface opposite to a surface thereof covering the thin-film heater;

wherein the thin-film heater is formed on at least one of the second surface of the second substrate and the second surface of the first substrate;

wherein the plurality of substrates include a third substrate bonded onto the electrically insulating film which covers the thin-film heater;

wherein the heat radiation preventing film is formed on an outer surface of the third substrate; and wherein the third substrate has a recess in a surface which opposes the thin-film heater.

2. A chemical reaction apparatus according to claim 1, wherein of the plurality of substrates, the at least one of the substrates in which the at least one flow path is formed is a silicon substrate.

3. A chemical reaction apparatus according to claim 1, further comprising a box member which covers all outermost surfaces of the plurality of substrates including the heat radiation preventing film, wherein a space is formed in at least a portion between an inner surface of the box member and the outermost surfaces of the plurality of substrates including the heat radiation preventing film.

4. A chemical reaction apparatus according to claim 3, wherein at least one part of the inner surface of the box member is covered with a radiation preventing film.

5. A chemical reaction apparatus according to claim 3, wherein at least one part of an outer surface of the box member is covered with a radiation preventing film.

6. A chemical reaction apparatus according to claim 3, wherein the space is set to at least one of: (i) a state in which a pressure in the space is set lower than an atmospheric pressure, and (ii) a state in which a gas having a thermal conductivity lower than a thermal conductivity of components of the box member is sealed in the space.

7. A chemical reaction apparatus according to claim 6, wherein the pressure in the space is set to no more than 100 Pa.

8. A chemical reaction apparatus according to claim 6, wherein the pressure in the space is set to no more than 10 Pa.

9. A chemical reaction apparatus according to claim 1, wherein the heating element comprises a thin-film heater, the flow path has a zigzagged shape, and the thin-film heater has one of: a zigzagged shape corresponding to the zigzagged shape of the flow path, and a rectangular shape covering substantially all of the flow path.

10. A chemical reaction apparatus according to claim 1, wherein the heat radiation preventing film comprises at least one of:

a first heat radiation preventing film which covers at least a portion of a second surface of the first substrate away from the first surface;

a second heat radiation preventing film which covers at least a portion of side surfaces of the first substrate, which are perpendicular to the second surface of the first substrate; and a third heat radiation preventing film which covers at least a portion of side surfaces of the second substrate, which are perpendicular to the second surface of the second substrate.

11. A chemical reaction apparatus according to claim 1, wherein one of: the recess is in a substantially vacuum state, and a gas having a thermal conductivity lower than a thermal conductivity of the third substrate is sealed in the recess.

12. A chemical reaction apparatus according to claim 1, wherein the heating element comprises:

a combustion flow path having a combustion catalyst layer formed in at least a portion thereof;

a supplying unit which supplies a combustion fluid to the combustion flow path; and a thermal energy generating unit which generates thermal energy in the combustion flow path by a combustion reaction on the combustion catalyst layer.

13. A chemical reaction apparatus according to claim 1, further comprising:

a supplying unit which supplies the fluid to the flow path; and a vaporizing unit which vaporizes the fluid in the flow path by heating the flow path by the heating element.

14. A chemical reaction apparatus according to claim 1, wherein a reaction catalyst layer is formed in the flow path.

15. A chemical reaction apparatus according to claim 14, wherein the reaction catalyst is a reforming catalyst, and the chemical reaction apparatus further comprises:

a supplying unit which supplies the fluid to the flow path; and a reforming unit which reforms the fluid in the flow path by heating the flow path by the heating element, thereby producing hydrogen.

16. A chemical reaction apparatus according to claim 15, wherein the fluid is a gas mixture of vaporized methanol and water.

17. A chemical reaction apparatus according to claim 15, wherein the reaction catalyst is a selective oxidation catalyst, and the chemical reaction apparatus further comprises:

a supplying unit which supplies the fluid to the flow path; and a removing unit which removes carbon monoxide from the fluid in the flow path by heating the flow path by the heating element.

18. A chemical reaction apparatus according to claim 17, wherein the fluid is a gas mixture containing carbon monoxide.

19. A chemical reaction apparatus comprising:

a plurality of substrates which are bonded to each other and which are heatable;

at least one flow path which is formed in at least one of the plurality of substrates, and through which a fluid flows, the flow path including an inlet opening and an outlet opening which are exposed on an outermost surface of the at least one of the plurality of substrates;

a heating element which is formed on at least one surface of at least one of the plurality of substrates to heat said plurality of substrates and to heat the flow path to a predetermined temperature so that a chemical reaction of the fluid flowing through the flow path is accelerated;

a heat radiation preventing film which contacts and covers at least a portion of one of: (i) the outermost surface of the at least one of the plurality of substrates and (ii) an outermost surface of the heating element to reflect at least a part of heat rays reflected from said outermost surfaces to thereby prevent lowering of a temperature of the flow path; and a box member which covers all of outermost surfaces of the plurality of substrates including the heat radiation preventing film;

wherein a space is formed in at least a portion between an inner surface of the box member and the outermost surfaces of the plurality of substrates including the heat radiation preventing film;

wherein the plurality of substrates include at least a first substrate having a first surface in which the flow path is formed, and a second substrate bonded to the first surface of the first substrate;

wherein the heating element comprises a thin-film heater, and the thin-film heater is formed on at least one of: a first surface of the second substrate that opposes the first substrate, a second surface of the second substrate away from the first surface of the second substrate, and a second surface of the first substrate away from the first surface of the first substrate;

wherein the heating element further comprises an electrically insulating film provided on the surface on which the thin-film heater is formed, and the electrically insulating film covers the thin-film heater and has a flat surface opposite to a surface thereof covering the thin-film heater;

wherein the thin-film heater is formed on at least one of the second surface of the second substrate and the second surface of the first substrate;

wherein the plurality of substrates include a third substrate bonded onto the electrically insulating film which covers the thin-film heater;

wherein the heat radiation preventing film is formed on an outer surface of the third substrate; and wherein the third substrate has a recess in a surface which opposes the thin-film heater.

20. A chemical reaction apparatus according to claim 19, wherein at least one part of the inner surface of the box member is covered with a radiation preventing film.

21. A chemical reaction apparatus according to claim 19, wherein at least one part of an outer surface of the box member is covered with a radiation preventing film.

22. A chemical reaction apparatus according to claim 19, wherein the space is set to at least one of: (i) a state in which a pressure in the space is set lower than an atmospheric pressure, and (ii) a state in which a gas having a thermal conductivity lower than a thermal conductivity of components of the box member is sealed in the space.

23. A chemical reaction apparatus comprising:
a plurality of substrates which are bonded to each other and which are heatable;
at least one flow path which is formed in at least one of the plurality of substrates, and through which a fluid flows;
a heating element which is formed on at least one surface of at least one of the plurality of substrates to heat said at least one of the plurality of substrates and to heat the flow path to a predetermined temperature so that a chemical reaction of the fluid flowing through the flow path is accelerated; and
a heat radiation preventing film which contacts and covers at least a portion of an outermost surface of at least one of the plurality of substrates to reflect at least a part of heat rays reflected from the outermost surface of said at least one of the plurality of substrates to thereby prevent lowering of a temperature of the flow path;

wherein the heat radiation preventing film comprises one of: (i) a metal film made of Au, Al, or Ag, and (ii) a metal oxide film made of $SnO_2$, $InO_3$, or ZnO;

wherein the plurality of substrates include at least a first substrate having a first surface in which the flow path is formed, and a second substrate bonded to the first surface of the first substrate;

wherein the heating element comprises a thin-film heater, and the thin-film heater is formed on at least one of: a first surface of the second substrate that opposes the first substrate, a second surface of the second substrate away from the first surface of the second substrate, and a second surface of the first substrate away from the first surface of the first substrate;

wherein the heating element further comprises an electrically insulating film provided on the surface on which the thin-film heater is formed, and the electrically insulating film covers the thin-film heater and has a flat surface opposite to a surface thereof covering the thin-film heater;

wherein the thin-film heater is formed on at least one of the second surface of the second substrate and the second surface of the first substrate;

wherein the plurality of substrates include a third substrate bonded onto the electrically insulating film which covers the thin-film heater;

wherein the heat radiation preventing film is formed on an outer surface of the third substrate; and wherein the third substrate has a recess in a surface which opposes the thin-film heater.

24. A chemical reaction apparatus according to claim 23, wherein one of: the recess is in a substantially vacuum state, and a gas having a thermal conductivity lower than a thermal conductivity of the third substrate is sealed in the recess.

25. A chemical reaction apparatus comprising:
a plurality of substrates which are bonded to each other and which are heatable;
at least one flow path which is formed in at least one of the plurality of substrates, and through which a fluid flows;
a heating element which is formed on at least one surface of at least one of the plurality of substrates to heat said at least one of the plurality of substrates and to heat the flow path to a predetermined temperature so that a chemical reaction of the fluid flowing through the flow path is accelerated;
a heat radiation preventing film which contacts and covers at least a portion of an outermost surface of at least one of the plurality of substrates to reflect at least a part of heat rays reflected from the outermost surface of said at least one of the plurality of substrates to thereby prevent lowering of a temperature of the flow path; and
a box member which covers all of outermost surfaces of the plurality of substrates including the heat radiation preventing film;

wherein a space is formed in at least a portion between an inner surface of the box member and the outermost surfaces of the plurality of substrates including the heat radiation preventing film;

wherein the plurality of substrates include at least a first substrate having a first surface in which the flow path is formed, and a second substrate bonded to the first surface of the first substrate;

wherein the heating element comprises a thin-film heater, and the thin-film heater is formed on at least one of: a first surface of the second substrate that opposes the first substrate, a second surface of the second substrate away from the first surface of the second substrate, and a second surface of the first substrate away from the first surface of the first substrate;

wherein the heating element further comprises an electrically insulating film provided on the surface on which the thin-film heater is formed, and the electrically insulating film covers the thin-film heater and has a flat surface opposite to a surface thereof covering the thin-film heater;

wherein the thin-film heater is formed on at least one of the second surface of the second substrate and the second surface of the first substrate;

wherein the plurality of substrates include a third substrate bonded onto the electrically insulating film which covers the thin-film heater;

wherein the heat radiation preventing film is formed on an outer surface of the third substrate; and wherein the third substrate has a recess in a surface which opposes the thin-film heater.

26. A chemical reaction apparatus according to claim 25, wherein one of: the recess is in a substantially vacuum state, and a gas having a thermal conductivity lower than a thermal conductivity of the third substrate is sealed in the recess.

* * * * *